(12) United States Patent
Ashdown et al.

(10) Patent No.: US 7,573,209 B2
(45) Date of Patent: *Aug. 11, 2009

(54) METHOD AND SYSTEM FOR FEEDBACK AND CONTROL OF A LUMINAIRE

(75) Inventors: Ian Ashdown, West Vancouver (CA); Shane P. Robinson, Gibsons (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 95 days.

This patent is subject to a terminal disclaimer.

(21) Appl. No.: 10/558,124

(22) PCT Filed: Oct. 12, 2005

(86) PCT No.: PCT/CA2005/001546

§ 371 (c)(1),
(2), (4) Date: Jan. 23, 2007

(87) PCT Pub. No.: WO2006/039789

PCT Pub. Date: Apr. 20, 2006

(65) Prior Publication Data

US 2007/0108846 A1 May 17, 2007

Related U.S. Application Data

(60) Provisional application No. 60/522,546, filed on Oct. 12, 2004, provisional application No. 60/664,415, filed on Mar. 23, 2005, provisional application No. 60/669,121, filed on Apr. 7, 2005.

(51) Int. Cl.
*G05F 1/00* (2006.01)
(52) U.S. Cl. .................. 315/307; 315/308; 315/149; 315/224; 315/291; 315/312

(58) Field of Classification Search .................. 315/308, 315/307, 149, 224, 291, 312; 345/76–78, 345/102; 362/612, 800
See application file for complete search history.

(56) References Cited

U.S. PATENT DOCUMENTS 3,787,752 A 1/1974 Delay (Continued)

FOREIGN PATENT DOCUMENTS

CA 2419515 8/2003

(Continued)

OTHER PUBLICATIONS

Author Unknown, "LEDs Magazine Review", IOP Publishing and Cabot Media Ltd., Issue 3, pp. 1-38, Oct. 2005.

(Continued)

*Primary Examiner*—Douglas W Owens
*Assistant Examiner*—Ephrem Alemu

(57) ABSTRACT

A method and system for controlling the chromaticity and luminous flux output of a digitally controlled luminaire. The luminaire comprises one or more light-emitting elements and one or more light sensors which can provide optical feedback, wherein this optical feedback is filtered to remove undesired frequencies. The method and system comprises a control system which can sample the filtered signals from the light sensors according to a predetermined feedback sampling frequency scheme, wherein this scheme is specifically configured to provide sufficient iterations of the feedback loop to be performed for adjustment of the chromaticity and luminous flux output of the light-emitting elements, without perceptible visual flicker or momentary chromaticity shifts.

20 Claims, 17 Drawing Sheets

U.S. PATENT DOCUMENTS

| | | | |
|---|---|---|---|
| 4,090,189 A | 5/1978 | Fisler | |
| 4,307,369 A | 12/1981 | Jackson, Jr. | |
| 5,067,704 A | 11/1991 | Tsuihiji et al. | |
| 5,625,636 A | 4/1997 | Bryan et al. | |
| 6,381,426 B1 | 4/2002 | Werner, Jr. et al. | |
| 6,392,577 B1 | 5/2002 | Swanson et al. | |
| 6,441,558 B1 * | 8/2002 | Muthu et al. | 315/149 |
| 6,495,964 B1 * | 12/2002 | Muthu et al. | 315/149 |
| 6,507,159 B2 | 1/2003 | Muthu | |
| 6,576,881 B2 | 6/2003 | Muthu et al. | |
| 6,630,801 B2 | 10/2003 | Schuurmans | |
| 6,753,661 B2 | 6/2004 | Muthu et al. | |
| 6,762,741 B2 * | 7/2004 | Weindorf | 345/102 |
| 6,833,691 B2 | 12/2004 | Chapuis | |
| 6,967,978 B2 | 11/2005 | Ohmori | |
| 7,140,752 B2 * | 11/2006 | Ashdown | 362/276 |
| 7,176,948 B2 | 2/2007 | Lewis | |
| 2003/0057888 A1 * | 3/2003 | Archenhold et al. | 315/291 |
| 2005/0259439 A1 * | 11/2005 | Cull et al. | 362/612 |

FOREIGN PATENT DOCUMENTS

| | | |
|---|---|---|
| JP | 03006921 | 1/1991 |
| WO | WO02/080625 | 10/2002 |
| WO | WO03/037042 | 5/2003 |
| WO | WO03/107319 | 12/2003 |

OTHER PUBLICATIONS

Gage et al., "Optoelectronics Applications Manual", McGraw-Hill Book Company, New York, New York, p. 9.12, 1977.

Mo et al., "Consecutive PWM Driving Video Led Display System", IEEE International Symposium on Circuits and Systems, pp. 1437-1439, Jun. 9-12, 1997.

Rea, Mark Stanley (ed.), "IESNA Lighting Handbook", 9$^{th}$ Edition, p. 27-4, Dec. 2000.

Rea, Mark Stanley (ed.), "IESNA Lighting Handbook", 9$^{th}$ Edition, p. 3-21, Dec. 2000.

Zukauskas et al., "Introduction to Solid-State Lighting", John Wiley & Sons, Inc., New York, New York, p. 136, 2002.

* cited by examiner

METHOD AND SYSTEM FOR FEEDBACK AND CONTROL OF A LUMINAIRE

FIELD OF THE INVENTION

The present invention pertains to a method and system for feedback and control of digitally controlled luminaries.

BACKGROUND

Existing commercially available light-emitting diodes (LEDs), including solid-state LEDs, organic light-emitting diodes (OLEDs), polymer light-emitting diodes (PLEDs), and electroluminescent devices, can be manufactured to generate light of different chromaticity with high electro-optical conversion efficiency. Single-colour and white light-emitting diodes can be used, for example, in luminaries whose luminous flux output and chromaticity can be digitally controlled.

The luminous flux output and chromaticity of LEDs are generally dependent on LED junction temperature, dominant wavelength shifts, manufacturing tolerances (especially dominant wavelength and luminous intensity binning), and device ageing. These dependencies are further compounded by their use in luminaries, where ambient operating temperatures and power supply voltage fluctuations must also be taken into consideration.

LED-based luminaires may also be used in conjunction with other light sources, including incandescent, fluorescent, and high-intensity discharge lamps, as well as direct and diffuse daylight, where it is desirable to maintain constant ambient light levels. It may also be desirable to maintain constant chromaticity with respect to electric lighting or vary the chromaticity in response to changing daylight conditions.

The luminous flux output and chromaticity of LEDs and LED-based luminaires can be digitally controlled in a number of different ways. It is usually necessary however to employ optical feedback to ensure predictable and repeatable luminous flux output and chromaticity from the LEDs and luminaries.

Digital control of the time-averaged luminous flux output of LEDs is well-known. For example, PWM control of the LED drive current, wherein the time-averaged luminous intensity is typically linearly proportional to the PWM duty cycle, is disclosed in U.S. Pat. Nos. 4,090,189 and 3,787,752. Today, PWM is the preferred method for LED luminous intensity control in that it offers linear control over a range of three decades (1000:1) or more without suffering power losses through current-limiting resistors, uneven luminous intensities in LED arrays, and noticeable colour shifts as identified by A. Zukauskas, M. S. Schur, and R. Caska, 2002, *Introduction to Solid-State Lighting*, New York, N.Y., Wiley-Interscience, p. 136. The PWM signals used to control the LEDs are preferably generated in hardware by microcontrollers and associated peripheral hardware.

A disadvantage of digital control is that the human visual system is extraordinarily sensitive to small but sudden changes in perceived brightness of illuminated surfaces, as shown for example by M. Rea, Ed., 2000, *IESNA Lighting Handbook, Ninth Edition*, New York, N.Y., Illuminating Engineering Society of North America, p. 3-21. To avoid the perception of such changes, it is necessary for the digital controller to generate at least 1,000 evenly-spaced intervals of perceived brightness.

The relationship between perceived brightness B and measured illuminance E (which is directly proportional to the luminous flux output of a luminaire) is described by Stevens' Law as follows:

$$B = aE^{0.5} \qquad (1)$$

where a is a constant. This "square law" relationship (M. Rea, Ed., 2000, *IESNA Lighting Handbook, Ninth Edition*, New York, N.Y., Illuminating Engineering Society of North America, p. 27-4) must be provided by the LED digital controller to provide perceptually smooth dimming of the LED or luminaire luminous flux output. This in turn requires the digital controller to generate at least 4,000 evenly-spaced intervals of luminous flux output. Given linear proportionality between the PWM duty factor cycle and LED luminous flux output, this requires a pulse width modulator with at least 12-bit resolution (4096 intervals), and preferably 14-bit (16, 386 levels) resolution.

Unfortunately, most commercially available microcontrollers with integrated PWM modules provide a maximum of 10-bit resolution. (Some microcontrollers, such as the Philips LPC2132, provide PWM modules with up to 16-bit resolution, but with maximum PWM frequencies of only about 900 Hz.) Commercially-available PWM integrated circuits are available with 12-bit and greater resolution, but they are expensive in comparison with the microcontrollers they are designed to be connected to.

The ease with which the average luminous intensity of LEDs can be varied has led to the use of light sensors (which are typically silicon photodiodes with associated colour filters) to determine the relative luminous flux output from LEDs and the ability to feed this information back to the LED system via an optical feedback loop. This information can then be used to determine any changes required to the LED control signals in order to obtain the desired luminous flux output chromaticity when multiple sensors and various coloured LEDs are used.

As may be readily understood, a digital controller requires the analog sensor signal to be digitized for use in a feedback loop to control the luminous flux output of an LED or LED-based luminaire. In order to maintain feedback loop stability, it is necessary for the resolution of the digitized signal to equal or exceed that of the digital output signal to the LEDs. Unfortunately, commercially available microcontrollers with integrated analog-to-digital converter (ADC) modules provide a maximum of 10-bit resolution. Commercially-available ADC integrated circuits are available with 12-bit and greater resolution, but they are expensive in comparison with the microcontrollers they are designed to be connected to.

Another constraint is that the PWM frequency must be at least about 100 Hz to avoid the perception of visual flicker (A. Zukauskas, M. S. Schur, and R. Caska, 2002, *Introduction to Solid-State Lighting*, New York, N.Y., Wiley-Interscience, p. 136). With a PWM resolution of 12 bits, this requires a PWM module clock frequency of about 400 kHz. As noted by Pacurra, P., and R. Borras, "Microcontroller-based LED Drivers: Topologies and Trade-offs," LEDs Magazine, October 2005, pp. 24-26, this is "almost impossible for a simple microcontroller" to achieve.

In addition, lifetime testing of LEDs has shown that continuous operation of LEDs using low frequency PWM with less than 100% duty factor can impose severe and repetitive thermal stresses on LED dies, which typically have thermal time constants of 10 milliseconds. At a PWM frequency of about 100 Hz, the luminous flux output can be severely degraded after only a few thousand hours of operation, and the mean-time-between failure (MTBF) can be reduced due to premature wire debonding and consequent device failure.

At PWM frequencies above about 5000 Hz however, repetitive thermal stresses are substantially eliminated.

Another consideration is that LED power supplies include magnetic components such as transformers and inductors that are subject to magnetostriction and consequent acoustic vibration. If the power supplies are subjected to cyclical loads such as are presented by PWM-controlled LEDs, the power supplies may generate acoustic hum at the PWM frequency. If this frequency is within the range of human perception (about 20 Hz to about 20 kHz), it may be perceived as an annoying hum or squeal. If the PWM frequency is above this range, then acoustic hum will not present a problem. Unfortunately, a minimum PWM frequency of about 25 kHz and a PWM resolution of 12 bits require a PWM clock frequency of about 100 MHz, which is almost impossible to achieve with commercially available microcontrollers.

Power supplies for LED-based luminaires must also typically convert alternating-current mains power to direct constant current. This process generally results in a residual ripple current due to incomplete filtering, and whose magnitude is dependent upon the power supply load presented by the LED drive circuitry. If the filtering is insufficient, the luminous flux output of the LEDs may vary according to twice the AC line frequency and present visual flicker to an observer.

Yet another consideration is that the chromaticity of an LED-based luminaire must be held constant as its luminous flux output changes. This requirement can be difficult to achieve with luminaires having a plurality of colour LEDs, for example red, green, and blue LEDs or warm white, green, and blue LEDs, as the luminous flux outputs and dominant wavelengths of the LEDs are in general dependent on the LED junction temperatures, which are in turn dependent on the drive currents. These may result in a nonlinear and time-dependent relationship between LED drive currents and luminous flux outputs as the LED-based luminaire is dimmed, so that the chromaticity of the luminaire is interdependent upon the time-varying LED drive currents and junction temperatures.

Another consideration is feedback loop stability. PWM controllers in prior art systems typically use low-speed PWM frequencies and either sample-and-hold sensor signal sampling or large time-constant low pass filters for filtering the continuous sensor signals (which are pulse-width modulated square waves). Either approach results in slow feedback loops with typical response times of less than about 10 Hz. Consequently, observers may notice visual flicker or momentary chromaticity shifts when the luminous flux intensity is suddenly changed. These undesirable visual effects may persist for several seconds until the feedback loop settles to its new equilibrium state.

Finally, the sensors themselves may have temperature-dependent responsivities. While an optical feedback loop can compensate for changes in shifts in luminous flux output and chromaticity of LED-based luminaires with a plurality of colour LEDs or colour and white light LEDs, it cannot compensate for changes in sensor responsivities.

Luminous flux output control of LEDs has been addressed in a number of United States patents, for example U.S. Pat. No. 3,787,752 that describes intensity control for a light emitting diode display. The invention describes how a series of power pulses can be used to effectively control LEDs that are unmatched in their lighting characteristics for low electric currents but matched for electric currents near their optimal operating conditions. This document however, does not describe how the duty factors of the LED current pulses can be reproducibly and discretely set, and is also only defined as applied to displays.

U.S. Pat. No. 4,090,189 discloses another luminous flux output control circuit for LED displays. The invention describes a PWM method for controlling LEDs over a relatively wide range of brightness levels that extends stable operation into the lower brightness region. This disclosure also does not describe how the duty factors of the LED current pulses can be reproducibly and discretely set to control brightness of the LEDs with a desired resolution.

In S. Gage, M. Hodapp, D. Evans, and H. Sorensen, 1977, *Optoelectronics Application Manual*, New York, N.Y., McGraw-Hill Book Company, p. 5.10, a photoconductor controls the duty cycle of a monostable multivibrator that provides PWM control of the luminous flux output of a dot matrix LED array. Ambient light incident upon the photoconductor changes its resistance, and thereby provides a signal for an optical feedback loop. It is however an analog control system, and as such does not have a practical means to provide for example square law dimming, nor does it consider multiple interdependent colour channels.

U.S. Pat. No. 6,576,881 discloses a light output control system wherein a plurality of photodiode sensors with red, green, and blue colour filters are employed to repetitively sample the respective luminous flux outputs of red, green, and blue LEDs, and to generate control signals for a digital controller used to control the LEDs. However, it does not address the issues of sensor and digital controller resolution or PWM frequency. It also does not consider the need to sample the sensors at a sufficiently high rate such that the luminaire chromaticity remains perceptually constant when its luminous flux output is suddenly changed, and it requires complex mathematical calculations to convert the sensor inputs to LED driver outputs that are difficult to implement in a high-speed digital feedback loop.

U.S. Pat. No. 6,507,159 discloses a method and system for controlling a red, green, and blue (RGB) LED-based luminaire which can track the tristimulus values of both feedback signals and reference signals whereby the LED drive currents driving the LEDs in the luminaire are adjusted in accordance with the deviations of the sensed tristimulus values and the reference tristimulus values until the deviations no longer exceed certain predefined maximal values. This invention utilizes photodiodes with filters and drives the LEDs at predetermined constant current amplitude. It does however not consider the need to sample the sensors at a sufficiently high rate such that the luminaire chromaticity remains perceptually constant when its luminous flux output is suddenly changed, and it requires complex mathematical calculations to convert the sensor inputs to LED driver outputs that are difficult to implement in a high-speed digital feedback loop.

U.S. Pat. No. 6,630,801 discloses a method and system for controlling an RGB based luminaire which measures the output of filtered and unfiltered photodiodes and correlates these values to chromaticity coordinates for each of the red, green, and blue LEDs of the luminaire, which is similar to that of U.S. Pat. No. 6,507,159, wherein U.S. Pat. No. 6,630,801 additionally utilizes an unfiltered photodiode as an improvement to the system. This system again however does not address the issues of sensor resolution and temperature dependencies. It also requires the use of memory-intensive lookup tables whose values must be predetermined for specific LEDs, and consequently it is not responsive to temperature-dependent changes in dominant wavelength or LED manufacturing tolerances.

U.S. Patent Application No. 2003/0230991 describes a similar a system that uses detected light signals fed back to lighting systems for control thereof, including the use of thermal sensors whose function is to provide signals for a thermal feedback circuit that compensates for LED luminous flux temperature dependencies. The invention does not however consider the issues of sensor digitization resolution.

U.S. Pat. No. 6,833,691 discloses a system and method for providing digital pulse width modulation. The invention describes a pulse width modulation system for use in a switching power supply circuit that provides high-resolution pulse width modulated signals. The system is configured to receive a control signal comprising a (m+n)-bit binary word and to provide a pulse width modulated signal with a predetermined average duty cycle having a resolution of substantially $2^{(m+n)}$. The pulse width modulation system includes a timing circuit for providing $2^m$ timing signals, a dithering circuit, and a signal generator. Upon receiving the control signal, the dithering circuit is configured to provide a modified control signal, which comprises a series of up to $2^n$ m-bit binary words. The signal generator is configured to receive the timing signals and the modified control signal and to provide the pulse width modulated signal having a duty cycle, which, when averaged over $2^n$ timing cycles, is approximately equal to the predetermined average duty cycle. The pulse width modulated signal is used by a switching power supply circuit to control at least one power switching device. In particular, this invention uses a complicated signal generating circuit with adders, delays, multiplexers, memory, and latch modules. In addition, in its preferred embodiment (m+n)-bit control words are mapped into a sequence of m-bit PWM duty factors in a way that creates artefacts when the (m+n)-bit word assumes its maximum value of $2^{m+n}-1$ Therefore there is a need for a new feedback and control system for digitally controlled luminaries such that it can provide perceptually visual smooth dimming and chromaticity control overcoming the identified inadequacies of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system for feedback and control of a luminaire. In accordance with an aspect of the present invention, there is provided a system for feedback and control of a luminaire including one or more light-emitting elements in one or more colours, each of the one or more light-emitting elements supplied with electrical current to produce light of a desired chromaticity and luminous flux under operating conditions, said system comprising: a feedback system including one or more light sensors for detecting the light and generating light values, said feedback system generating current values representative of luminous flux and chromaticity of the light from the light values; and a control system operatively integrated with the feedback system, said control system determining an adjustment factor through a correlation of the current values and a desired chromaticity and luminous flux, said control system adjusting the electrical current to one or more light-emitting elements in accordance with said adjustment factor, said control system adjusting the electrical current without perceivable visual flicker or momentary chromaticity shifts.

In accordance with another aspect of the invention, there is provided a method for controlling a luminaire including one or more light-emitting elements in one or more colours, each of the one or more light-emitting elements supplied with electrical current to produce light of desired chromaticity and luminous flux under operating conditions, the method comprising the steps of: sensing predetermined fractions of light emitted by the luminaire in each of the one or more colours providing one or more sensed colour signals; processing each of the one or more sensed colour signals thereby determining one or more filtered colour signals; transforming the one or more filtered colour signals directly into control signals representative of the desired chromaticity and luminous flux; and adjusting electrical current supplied to each of the one or more light-emitting elements based on the control signals, wherein the step of adjusting is performed without perceivable visual flicker or momentary chromaticity shifts.

DETAILED DESCRIPTION OF THE INVENTION

Definitions

Figure 1:
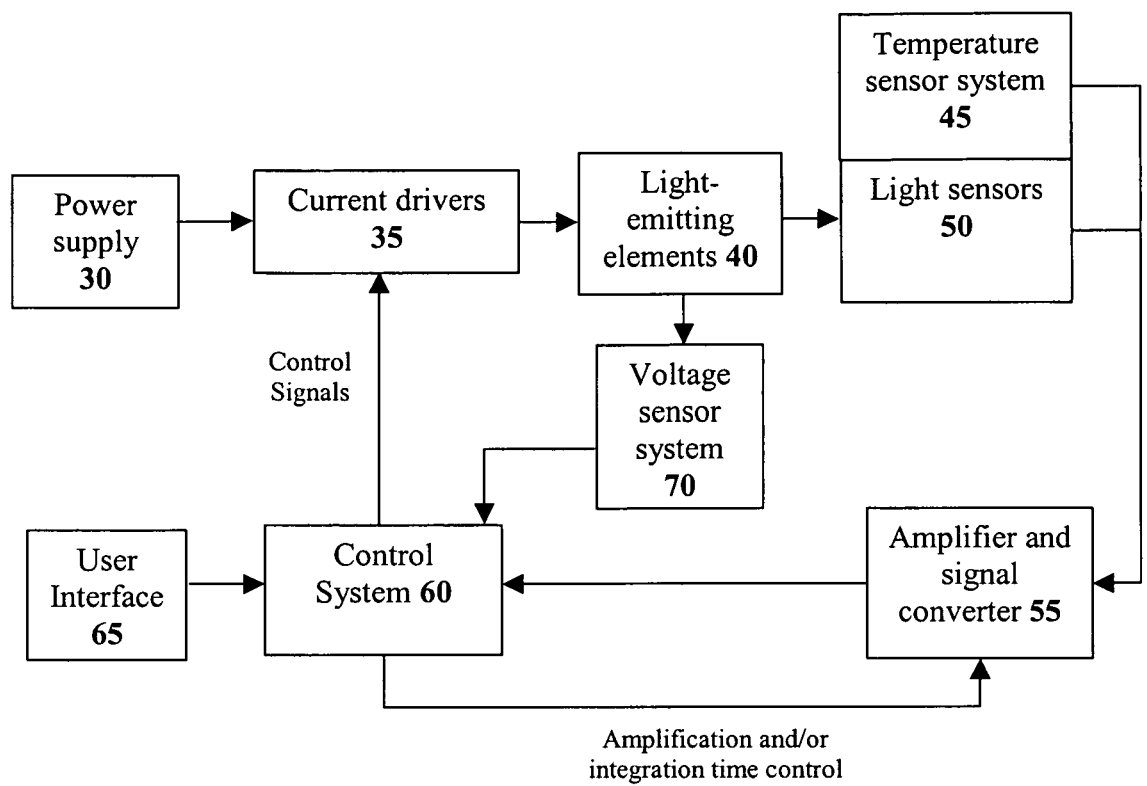
FIG. 1 illustrates the architecture of a control system for a luminaire according to one embodiment of the present invention.

The term "light-emitting element" is used to define any device that emits electromagnetic radiation within a wavelength regime of interest, for example, visible, infrared or ultraviolet regime, when activated, by applying a potential difference across the device or passing a current through the device. Examples of light-emitting elements include solid-state, organic, polymer, phosphor coated or high-flux light-emitting diodes (LEDs) or other similar devices as would be readily understood.

The term "chromaticity" is used to define the perceived colour impression of light according to standards of the Commission Internationale de l'Eclairage.

The term "luminous flux" is used to define the quantity of luminous flux emitted by a light source according to standards of the Commission Internationale de l'Eclairage. Where the wavelength regime of interest includes infrared and/or ultraviolet wavelengths, the term "luminous flux" is used to define both luminous flux and radiant flux according to standards of the Commission Internationale de l'Eclairage.

The term "illuminance" is used to define the quantity of luminous flux received by a surface per unit area according to standards of the Commission Internationale de l'Eclairage.

The term "amplification circuitry" is used to define the circuitry that receives the detected signal, manipulates the detected signal and provides one or more output signals as a result of the manipulation. This manipulation may include conversion of the signal, amplification of the signal, and/or any other manipulation, as would be readily understood by a worker skilled in the art.

The term "relative resolution" is used to define the minimum distinguishable percentage change in a signal after digitization. A device enabling analog-to-digital conversion is typically designed to digitize a signal using a predetermined number of bits and can typically convert a maximum analog signal to a digital signal. The number of subdivisions into which the maximum analog signal can be divided defines the resolution of the particular device. For example, a device using 10 bits for conversion at a maximum signal of 10V has a resolution of 0.01V. The relative resolution is the resolution of the device divided by the magnitude of the analog signal being converted times 100. The relative resolution of a signal being converted which has a magnitude of 10V, is thus 0.1% or (0.01V/10V*100). And the relative resolution of a signal which has a magnitude of 2V, for example, which is being converted by the above device, is 0.5% or (0.01V/2V*100).

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention comprises a method and system for controlling the chromaticity and luminous flux output of a digitally controlled luminaire. The luminaire comprises one or more light-emitting elements and one or more light sensors which can provide optical feedback, wherein this optical feedback can be filtered to improve the S/N ratio and to remove identifiable undesired frequencies, such as the pulse width modulation frequency. The method and system comprises a control system which can sample the filtered signals from the light sensors according to a predetermined feedback sampling frequency scheme, wherein this scheme is specifically configured to provide sufficient iterations of the feedback loop to be performed for adjustment of the chromaticity and luminous flux output of the light-emitting elements, without perceptible visual flicker. Therefore the control system can maintain stable operating conditions and can respond to system state change events, for example, an operational luminous flux output adjustment or chromaticity adjustment, within a predetermined response time thereby limiting perceptible visual flicker of the luminaire.

In one embodiment, the present invention comprises a means for the detection of light from a light source having varying luminous flux output, while enabling a desired relative resolution to be obtained upon analog-to-digital conversion of the signal resulting from luminous flux detection. When the luminous flux detected is at one level, a particular gain can be applied to the detected signal and when the luminous flux is at another level a different gain can be applied to the detected signal, thereby generating a signal that can be converted from an analog-to-digital format while retaining a desired relative resolution. For example, when the luminous flux of the detected light is relatively high, a relatively low gain may be applied and when the luminous flux of the light detected is relatively low a larger gain may be applied, thereby for each case a desired relative resolution of the converted signal can be achieved. In addition, multiple gains can be applied to each detected signal. The present invention may also provide multiple levels of gain for varying levels of luminous flux generated by the light source.

In another embodiment, the present invention comprises a logarithmic amplifier that converts the detected signal from the light sensor into the logarithm of the detected signal. As will be understood by those familiar with the art of telephony, an audio signal with a dynamic range of 14 to 16 bits (16,000:1 to 65,000:1) can be compressed into an 8-bit dynamic range (250:1) for transmission using the A-law telephony companding algorithm. This algorithm relies on the fact that the perception of acoustic intensity is directly proportional to the logarithm of the sound pressure level. Therefore, although the A-law telephony companding algorithm performs lossy compression in that information is lost when the 8-bit compressed signal is subsequently expanded into its original dynamic range, the difference between the expanded signal and the original signal is not perceptible. It is further evident that A-law companding increases the gain of low-level signals while decreasing the gain of high-level signals, thereby reducing the need for resolution of the audio signal digitizer from 16 bits to 8 bits.

Therefore in a similar manner and in accordance with Stevens' Law, the perceived brightness of an illuminated surface is directly proportional to the square root of its illuminance. Thus, increasing the gain for low-level light sensor signals while decreasing the gain of high-level signals does not result in a significant loss of signal information. It does however reduce the need for resolution of the light sensor signal ADC from 14 bits to 10 bits.

As may be appreciated by those skilled in the art of feedback system design, it is not necessary to have a perfectly linear amplifier when feedback is applied to the amplifier system. Similarly, it is not necessary to have a perfect square root amplifier to convert the light sensor signal into a representation of perceived brightness. Thus, while square root amplifier integrated circuits such as the Analog Devices AD532 four-quadrant multiplier are commercially available but expensive, an inexpensive logarithmic amplifier based on an operational amplifier with a common-base transistor in its feedback loop can be suitable. For example such an operational amplifier is described in Terrel, D. L., 1996, *Op Amps. Design Application, and Troubleshooting*, Second Edition, Boston, Mass.: Butterworth-Heinemann, p. 410-411, herein incorporated by reference.

In another embodiment, the present invention comprises a means for the extension of a standard N-bit digital pulse width control method which can discriminate $2^N$ discrete pulse widths per pulse cycle, wherein the pulse widths can be modulated over a period of $2^M$ pulse cycles in which each pulse cycle can have its own pulse width or respective duty cycle. The resulting time averaged or effective pulse width therefore can be controlled with a resolution of $2^{N+M}$ states, which is higher than the resolution of $2^N$ states for the standard method, thereby enabling more refined control over the light-emitting elements in a luminaire during dimming thereof, for example. A particular advantage of this embodiment is that the same PWM frequency that is determined to be necessary for pulse width modulation with N+M-bits resolution can be used with "extended" PWM with N-bits resolution while achieving the same advantages of freedom from visual flicker and thermal stressing of the LED die.

The dynamics of the electro-optical conversion in light-emitting elements and the opto-electrical conversion in light sensors such as photodiodes typically occurs at a time scale of the order of nanoseconds and can be considered substantially instantaneous. The light sensors can be integrated into the luminaire such that each light sensor can detect luminous flux from a subset of light-emitting elements, for example by colour filtering, shielding or phase locked additive or subtractive detection synchronous with the detection of luminous flux emitted by predetermined sets of light-emitting elements and subsequently produce a signal representative of the detected light. Consequently, the signal generated by each light sensor under operating conditions can provide a measure of the luminous flux output of the one or more light-emitting elements from which it can detect light. The sensed signal from a light sensor can be passed through a low-pass or bandpass filter having predetermined or adjustable filter characteristics. The filter characteristics can be set such that the filtered signal only follows dynamics within a desired frequency domain of the detected signal; for example, signal fluctuations at the PWM frequency of a detected PWM-driven signal can be suppressed by the filter.

FIG. 1 illustrates the architecture of a feedback and control system for a luminaire according to one embodiment of the present invention. The luminaire comprises one or more light-emitting elements 40 for the generation of light, wherein the light-emitting elements 40 are electrically connected to the power supply 30 via the current drivers 35. The power supply 30 can be for example, based on an AC/DC or DC/DC converter. If there are multiple colours of light-emitting elements, separate current drivers 35 can be provided for each colour, thereby enabling the supply of the necessary forward currents to each of the colours of light-emitting elements 40.

One or more light sensors 50 are provided for detecting luminous flux output from the luminaire. In one embodiment, separate light sensors 50 are provided for each colour of the light-emitting elements 40. In addition, a colour filter can be associated with one or more of the light sensors 50. Each light sensor 40 is electrically connected to an amplifier and signal converter 55 which can convert the sensed signal into an electrical signal that can be processed by the control system 60. In one embodiment the control system 60 can control the amplification and integration control signals of the amplifier and signal converter 55. It is understood, that each light sensor 50 can detect an amount of luminous flux which is sufficient to provide a stable photocurrent which provides a signal having a minimum required signal-to-noise ratio. Furthermore, the light sensors 50 can be shielded such that stray or ambient light cannot be detected thereby, although in one embodiment it is advantageous to detect the ambient light, for example daylight.

A user interface 65 is coupled to the control system 60 and provides a means for obtaining information relating to a desired colour temperature, chromaticity and/or desired luminous flux output for the luminaire from a user or other control device, such as for example a programmable 24-hour timer or a theatrical lighting console. This information is converted into appropriate electrical reference signals for use by the control system 60. The control system 60 additionally receives feedback data from the light sensors 50 relating to the luminous flux output from the luminaire. The control system 60 can thereby determine appropriate control signals for transmission to the current drivers 35 in order to obtain the desired luminous flux and chromaticity of light to be produced by the luminaire. The control system 60 can be a microcontroller, microprocessor or other digital signal processing system as would be readily understood by a worker skilled in the art.

In one embodiment, as illustrated in FIG. 1 the control system 60 can optionally be operatively coupled to one or more temperature sensor elements 45. The temperature sensors 45 can provide information about the temperature of the light-emitting elements 40 under operating conditions. Information about the temperature of the light-emitting elements 40 can be used to compensate for temperature-dependent luminous flux fluctuations and LED dominant wavelength shifts. For example, the temperature of light-emitting elements 40 can be determined by measuring the forward voltage of a group of light-emitting elements, the resistance of a thermistor, or the voltage of a thermocouple. Consequently, the control system 60 can control the current drivers 35 to adapt the drive current for the group of light-emitting elements 40 in a feed-forward manner.

Similarly, one or more temperature sensor elements 45 can provide information about the ambient temperature of the light sensors 50 under operating conditions. This information can be used to compensate for temperature-dependent changes in the light responsivities in a feed-forward manner.

In one embodiment, the control system 60 responds to signals from both the light sensors 50 and the temperature sensors 45, as a digital feedback control system 60 responding to only the light sensors 50 can exhibit less long-term stability in the maintenance of constant luminous flux output and chromaticity.

In another embodiment, as illustrated in FIG. 1 the control system can optionally comprise one or more voltage sensor elements 70 that are connected to and detect the forward voltage of the light-emitting elements 40. The voltage sensor signals can be filtered with a bandpass filter whose center frequency is equal to twice that of the AC line frequency. The control system 60 can continually sample the voltage sensor signals to measure the residual ripple current due to incomplete power supply filtering and adjusts the duty cycle of the PWM drive signals to current drivers 35 in order to maintain constant luminous flux output from the light-emitting elements 40 in the presence of the residual current ripple. The sampling frequency of the voltage sensor signals is typically greater than about 300 Hz in order to minimize visual flicker.

Input Signal Resolution and Input Signal Range

The control design for the luminaire comprises a feedback control loop which can maintain a desired chromaticity and luminous flux of the light emitted by the luminaire under operational conditions including dimming of the luminaire. The feedback control loop comprises one or more light sensors which can provide optical feedback such as a measure of the luminous flux output from one or more light-emitting elements. The optical feedback of a digitally controlled luminaire having one or more light-emitting elements in white or each of a plurality of colours, for example, red, green, blue, and amber, typically requires 8-bit resolution per colour at all desired luminous flux levels. In addition, dimmable luminaries which can create perceptually smooth luminous flux output variations require this resolution between substantially ten percent i.e. one percent of the perceived brightness of the luminaire, and the full nominal luminous flux output rating of the luminaire. In consequence, the control system can require processing luminous flux signals at an additional six to seven bits for a total of 14-bit to 15-bit resolution. As most common inexpensive microprocessors only have 10-bit ADCs, in order to maintain a given chromaticity over the full dimming range, variable gain and integration time circuitry or firmware can be used to maintain the required resolution.

The control system can adequately control in a stable fashion the luminous flux and chromaticity of a luminaire which is configured in a manner that a substantially equal amount of luminous flux from each of the light-emitting elements is incident upon the light sensor or collection of light sensors. In consequence, each light sensor can generate a signal which is directly proportional to the total luminous flux output of the luminaire. The control system can comprise one or more light sensors for each colour of the one or more light-emitting elements of the luminaire.

Input Signal Filtering

In one embodiment, where the luminous flux detected is used to provide control signals to a controllable light source, for example an LED-based system, a signal representative of the detected signals can be fed back to the lighting system, thereby enabling this lighting system to compensate for externally-generated luminous flux, such as that from other luminaires or daylight, as well as the luminous flux being emitted thereby, or to enable the lighting system to maintain desired luminous flux and chromaticity levels, for example. The representative signals fed back may then be used to determine any changes to the lighting system that may be necessary for achieving a particular lighting condition. The representative signals may be fed back directly by means of a feedback loop, for example, where control signals of the lighting system can be automatically modified as required based on the feedback signals.

In one embodiment, the light sensors are three photodiodes with red, green and blue filters for measuring the spectral luminous flux emitted by the luminaire under operational conditions. For example, a Texas Advanced Optical Instruments TSLx257 is an integrated device that provides additional signal pre-amplification that can be used with the present invention. The light sensors are connected to a low pass filter system which can attenuate, for example, the PWM frequency of the PWM-driven light-emitting elements. The output of the filter system can be connected to a subsequent amplifier or impedance modifier system which can amplify the colour signals and provide additional impedance conversion for improved coupling to an attached system of ADCs or to a processing unit system with integrated ADC stages. The ADC system converts the analog colour signals into digital colour signals and can provide the digital colour signals in a suitable format as required by the control system. The control system can sample each colour signal periodically or intermittently and perform any desired signal processing to achieve desired control signal resolution and dynamic range.

In another embodiment, the filter system is one or a multiplicity of band rejection filters whose center frequencies are equal to the PWM frequency. An advantage of band rejection filters is that they do not attenuate high-frequency optical signals that may be used for example for free-space optical communications wherein the light-emitting elements are employed as optical data transmitters and the optical sensors are optionally employed as optical data receivers.

In another embodiment, the filter system is one or a multiplicity of switched-capacitor band rejection filters whose switching frequency is equal to the PWM frequency. A particular advantage of these filters is that they can exhibit a multiplicity of band rejection frequencies that are effective in attenuating the PWM frequency and its harmonics.

In another embodiment, the filter system is one or a multiplicity of switched-capacitor bandpass filters whose switching frequency is equal to the PWM frequency. A particular advantage of said filters is that their center frequencies can be synchronized with the PWM frequency. By frequency modulating the PWM frequency for each LED colour, a multichannel free-space optical communications system wherein the light-emitting elements are employed as optical data transmitters and the optical sensors are optionally employed as optical data receivers can be effected.

The light sensors may be silicon photodiodes or any other light-sensitive sensor, as would be readily understood by a worker skilled in the art. In some embodiments an array of light sensors may be used for the detection of light, wherein each of the sensors are responsive to particular ranges of wavelengths of the luminous flux being detected. In other embodiments one or more sensors that are responsive to the full range of frequencies of the detected luminous flux may be used. In yet a further embodiment a combination of sensors that are responsive to particular ranges of wavelengths and sensors that are responsive to the full range of detected wavelengths may be used.

In one embodiment, the control system can additionally control the gain of the amplifier system to amplify weak low pass filter output signals to map them onto the full input signal range of the A/D converter system. This can significantly improve the overall signal-to-noise ratio and the stability of the feedback control system, particularly at low luminaire brightness, for example, while dimming the luminaire.

Variable Gain Circuitry

In one embodiment, the present invention comprises a means for the detection of luminous flux from a light source having varying luminous flux output, while enabling a desired relative resolution to be obtained upon analog-to-digital conversion of the signal resulting from luminous flux detection. When the luminous flux detected is at one level, a particular gain can be applied to the detected signal and when the luminous flux of light is at another level a different gain can be applied to the detected signal, thereby generating a signal that can be converted from an analog to a digital format while retaining a desired relative resolution.

By providing a relatively large gain during low light-level conditions, a more accurate measure of the luminous flux output by the luminaire can be achieved. Consider for instance, when an ADC subsequently processes the detected signals, conversion of larger analog signals to digital signals enables smaller changes to be detected compared to when smaller analog signals are converted to digital signals for a given conversion resolution. For example, assuming a 10-bit ADC is configured to convert a maximum voltage of 10V to a digital signal, the conversion resolution would be approximately 0.01V. Therefore, when a 10V signal is received by the ADC, the smallest detectable change will be approximately 0.1%, whereas when a 5V signal is received by the same ADC, the smallest detectable change will be approximately 0.2%. Thus, by providing gain to small detected signals, the signal can be detected with greater accuracy and can result in a relative resolution that can be essentially independent of the magnitude of the detected signal.

In one embodiment, the particular gain applied to the detected signals can be selectable by switching means. The switching means may be enabled automatically using a feedback signal representative of the previously detected signal or may be enabled using pre-programmed instructions. The switching means may comprise any switch, for example, a FET switch, BJT switch or any other switch, as would be readily understood by a worker skilled in the art.

In another embodiment a detected signal can have two different gains individually applied thereto, wherein a downstream signal processing means can be used to determine which of these two amplified signals is the appropriate amplified signal to be further processed or fed back to a luminaire for control thereof, for example.

In another embodiment, the particular gain applied to the detected signals may be selectable by means of a programmable gain amplifier or an amplifier with a digital potentiometer incorporated in its feedback loop.

In another embodiment, the particular gain applied to the detected signals is provided by an operational amplifier with a logarithmic transfer function that is preferably implemented by an operational amplifier with a common base transistor incorporated in its feedback loop.

Figure 2:
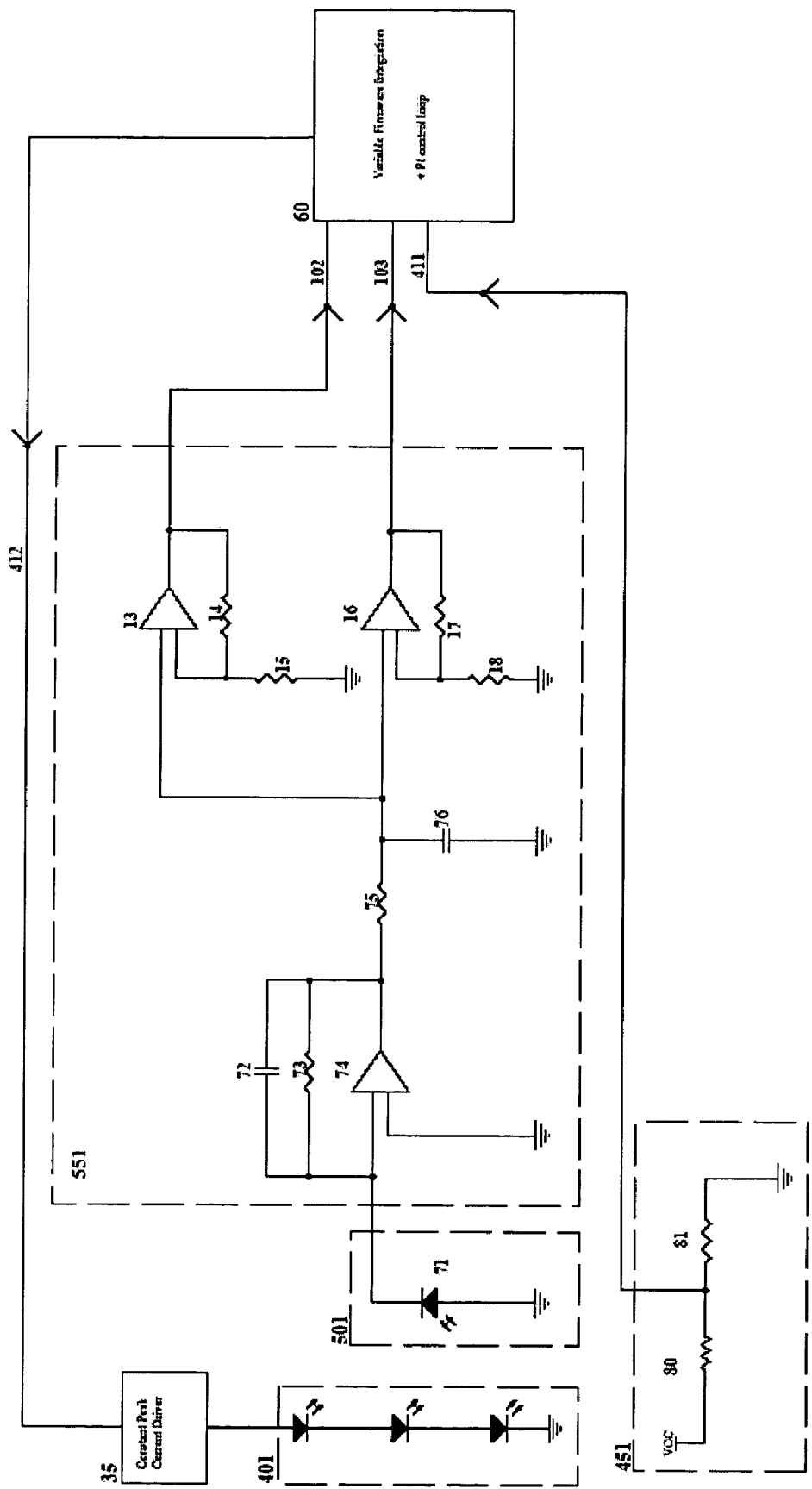
FIG. 2 illustrates one embodiment of a detection component according to the present invention in which the gain applied to a detected signal is selectable by means of switches.

In one embodiment, as illustrated in FIG. 2, a two-stage amplification circuit 551 is used to convert a detected current signal from light sensor 71, for example a photodiode, into a voltage signal and provide gain to the detected current signal. In the first stage, charge amplifier 74 converts the detected signal from a current signal to a voltage signal and may provide a particular gain to the detected signal, wherein operational parameters of the charge amplifier can be modified by changing the characteristics of the capacitor 72 and/or the resistor 73. The second stage provides gain to the signal received from the first stage. The second stage comprises two operational amplifiers, amplifier 13 and amplifier 16. The gain provided by amplifier 13 can be determined by the values of resistor 14 and resistor 15 and the gain provided by amplifier 16 can be determined by the values of resistor 17 and resistor 18. Therefore, the values of resistor 14 and resistor 15, can be selected to provide a particular gain to the signal received from the first stage, for example a high gain can be provided for the detection of low intensity light; and resistor 16 and resistor 17 can be selected to provide a different gain, for example a low gain for the detection of light of high intensities. The signals 102 and 103 output from amplifier 13 and amplifier 16, respectively, is input to control system 60, which can be a microcontroller or other signal processing means as would be readily understood by a worker skilled in the art. For example, in one embodiment of the present invention, the signal from the amplification circuitry can be input directly to an ADC that is integral to a microcontroller. In other embodiments additional circuitry may be present along the path of signals 102 and 103 output from amplification circuitry 551 prior to being input into a signal processing means. For example, in one embodiment of the present invention signals 102 and 103 output from amplification circuitry 551 are input to an analog multiplexer and then subsequently input to a signal processing means such as a microcontroller or an ADC.

For each signal produced by light sensor 71 as a result of incident luminous flux thereupon, both output signals 102 and 103 are subsequently input to a signal processing means and any additional intermediate circuitry that may be present. The signal processing means can determine and select the appropriate signal from the signals it receives, for further processing. For example, in one embodiment of the present invention, when a particular signal received by the signal processing means is below or above a certain threshold, the signal processing means can either further process the signal or ignore the signal depending on whether it was below or above the particular threshold. In this way, the appropriate signals can be selected for providing feedback to the lighting system, for example.

In further embodiments, additional amplification stages may be present within amplification circuitry 551. Additional amplifiers may also be present within each amplification stage to provide additional levels of gain achievable with that particular stage. For example, the second stage may comprise three amplifiers, wherein one amplifier provides a low gain, another amplifier provides a high gain and a third amplifier provides an intermediate gain.

Figure 3:
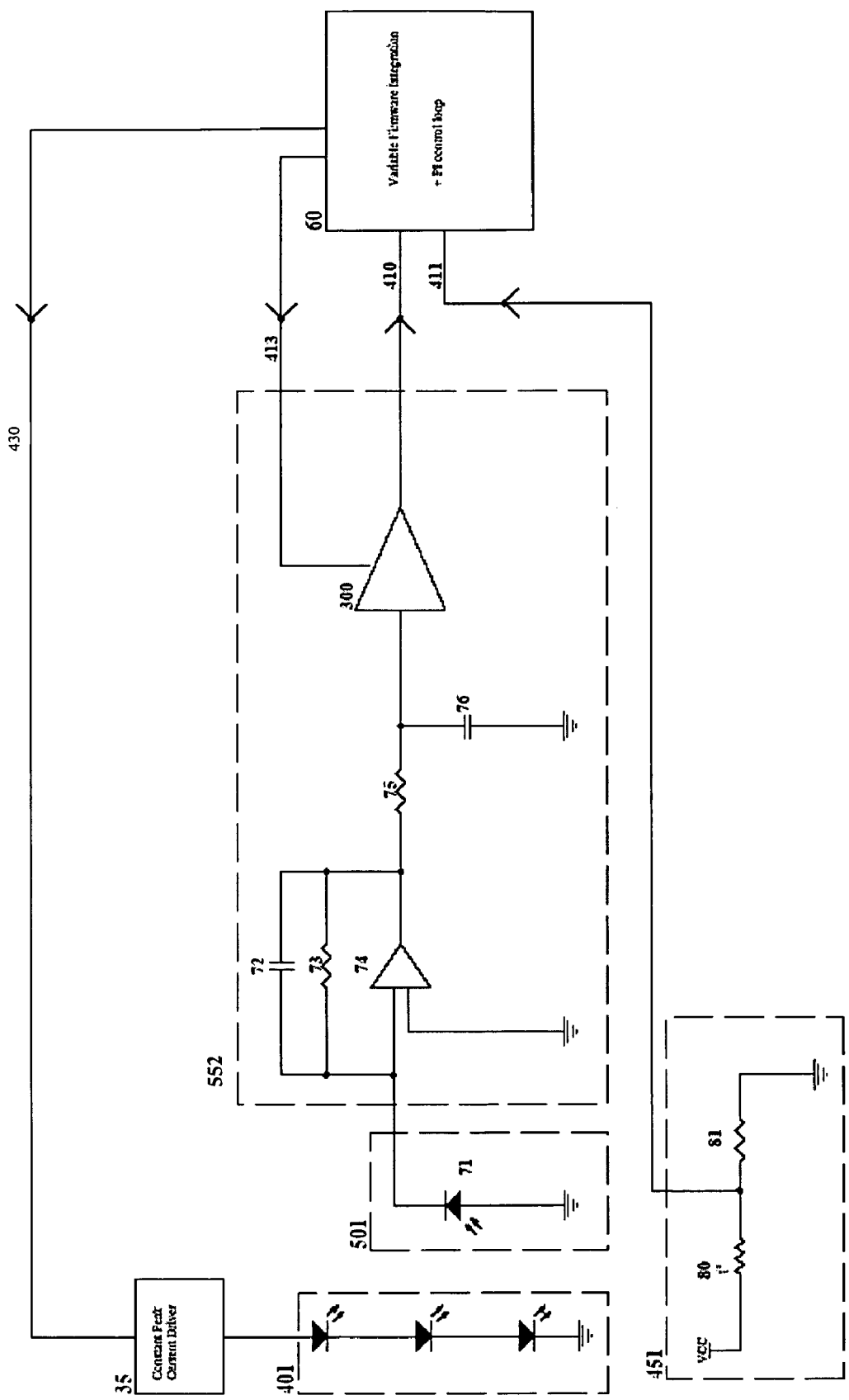
FIG. 3 illustrates another embodiment of a detection component according to the present invention in which programmable gain is provided to signals detected by a light sensor.

In another embodiment, as illustrated in FIG. 3, a two-stage amplification circuit 552 is used to convert a detected current signal from light sensor 71 into a voltage signal and provide gain to the detected current signal. In the first stage, charge amplifier 74 converts the detected signal from a current signal to a voltage signal and may provide a particular gain to the detected signal. The second stage comprises a programmable gain amplifier 300 whose gain is dynamically controlled by the control system 60 in response to the level of the signal 410 received from the amplification circuit 552.

Figure 4:
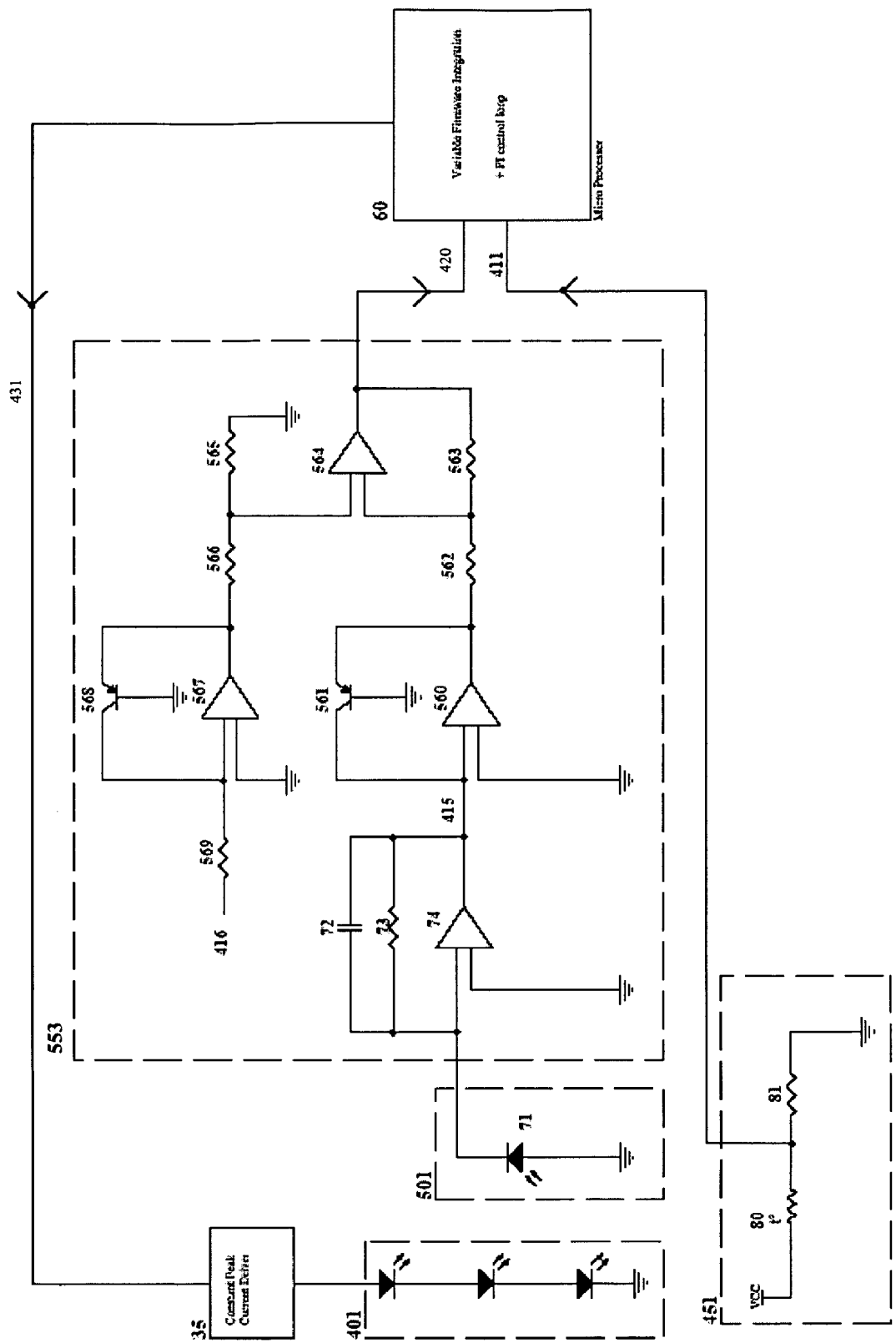
FIG. 4 illustrates another embodiment of a detection component according to the present invention in which logarithmic gain is provided to signals detected by a light sensor.

In another embodiment, as illustrated in FIG. 4, a two-stage amplification circuit 553 is used to convert a detected current signal from light sensor 71 into a voltage signal and provide gain to the detected current signal. In the first stage, charge amplifier 74 converts the detected signal from a current signal to a voltage signal and may provide a particular gain to the detected signal. The second stage provides logarithmic gain to the signal received from the first stage, wherein the second stage comprises two operational amplifiers 560 and 567 with common base NPN transistors 561 and 568 incorporated in their feedback loops which effect a logarithmic rather than a linear input-output transfer function. The first operational amplifier 560 provides logarithmic gain to the first stage voltage signal, while the second operational amplifier 567 provides logarithmic gain to a reference voltage. The gain of both logarithmic amplifiers is dependent on the temperature-dependent emitter-base diode saturation current of NPN transistors 561 and 568, and so a third linear operational amplifier 564 functions as a subtractor to eliminate the temperature dependencies of the logarithmic amplifiers and can function as follows:

$$\log(a/b) = \log(a) - \log(b) \tag{2}$$

Figure 5:
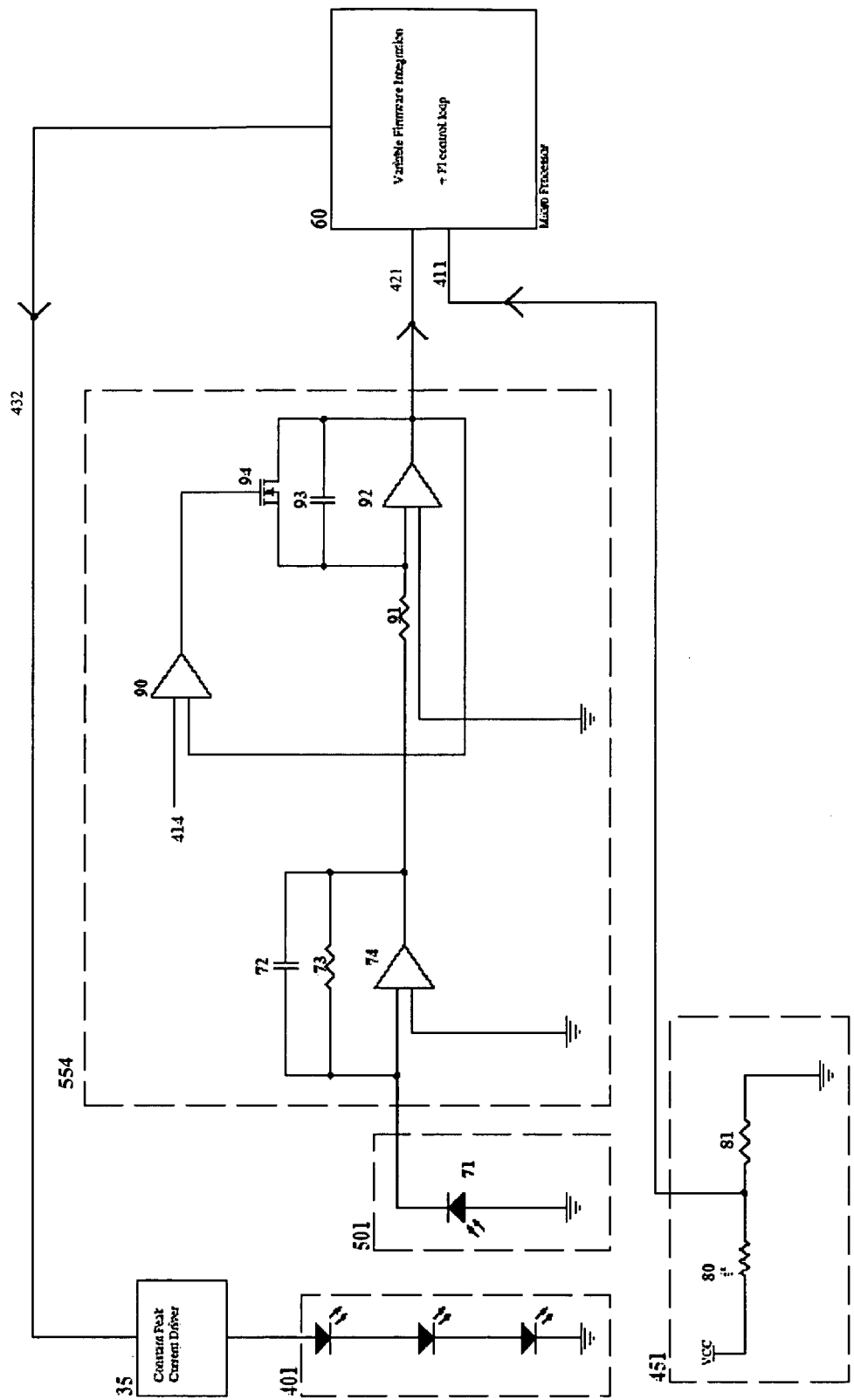
FIG. 5 illustrates another embodiment of a detection component according to the present invention in which single-slope integration is provided to signals detected by a light sensor.

In another embodiment, as illustrated in FIG. 5, a two-stage amplification circuit 554 is used to convert a detected current signal from light sensor 71 into a voltage signal and provide gain to the detected current signal. In the first stage, charge amplifier 74 converts the detected signal from a current signal to a voltage signal and may provide a particular gain to the detected signal. The second stage includes a single-slope integrator comprising operational amplifier 92, capacitor 93, and resistor 91, MOSFET transistor 94, and comparator 90. When the comparator 90 output is low, the integrator is allowed to charge the capacitor 93 in a linear fashion. The time it takes for the capacitor 93 to charge up to the same voltage as the DC reference signal 414 depends on the reference voltage 414, the voltage level at the output of charge amplifier 14, and the values of resistor 91 and capacitor 93.

When the voltage across capacitor 93 equals the reference voltage 414, the output of comparator 90 goes high, discharging the capacitor 93 through the MOSFET transistor 94. When the integrator output voltage 421 falls to zero, the output of comparator 90 switches back to a low state, enabling the integrator to ramp up voltage again.

The average voltage present at the output of op amp 74 can be determined by the amount of time it takes for the integrator to charge and discharge, and can be counted by the control system 60.

As will be obvious to one skilled in the art, a dual-slope integration circuit may be used in place of the single-slope integration circuit described above.

In another embodiment, the integration circuit as illustrated in FIG. 5 can be replaced by an integration circuit with a variable integration time constant. The converted signal generated by the integration circuit can be transmitted to a signal processing means, for example a microcontroller or an ADC. The variable integration time constant associated with this integrating circuit can be controlled by a microcontroller, thereby enabling a desired relative resolution to be achieved by integration. As would be readily understood, this embodiment can be more complex than that illustrated in FIG. 5, as the integration circuit would typically include an operational amplifier, a means to zero the integrator and a means to control the integration time constant as would be readily understood by a worker skilled in the art. This embodiment of the present invention can provide more dynamic control of the resolution of the converted signal.

Figure 6:
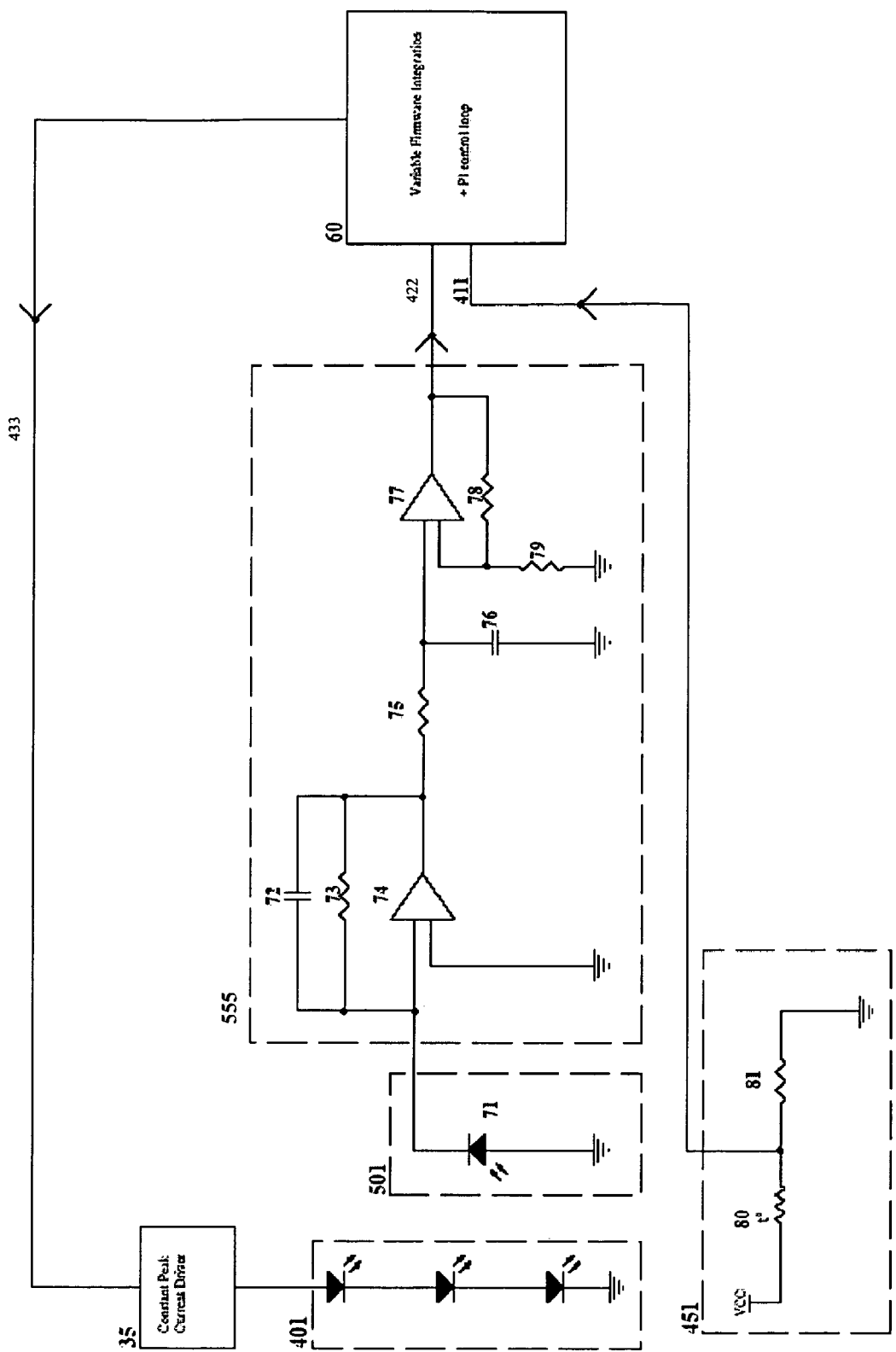
FIG. 6 illustrates another embodiment of a detection component according to the present invention in which integration of the signals detected by a light sensor is provided by a microcontroller.

In another embodiment, as illustrated in FIG. 6, a two-stage amplification circuit 555 is used to convert a detected current signal from light sensor 71 into a voltage signal and provide gain to the detected current signal. In the first stage, charge amplifier 74 converts the detected signal from a current signal to a voltage signal and may provide a particular gain to the detected signal. The second stage comprises a single-pole low-pass filter consisting of resistor 75 and capacitor 76, followed by voltage amplifier 77. The output 422 of amplification circuit 555 is connected to control system 60, which preferably is a microcontroller with an integral ADC. The microcontroller performs the function of an integration circuit with a variable integration time constant in firmware.

In another embodiment, a voltage-to-frequency circuit can be interposed between the output of the second gain stage as illustrated in FIGS. 3, 4, 5, and 6. The digital signal generated by the voltage-to-frequency circuit can be directly connected to control system 60, which may be for example a digital input port of a microcontroller. This obviates the need for an ADC, as the control system can count the digital signal transitions within a predetermined time interval to determine the level of the second gain stage output signal.

Alternately, an integrating circuit as previously described, can be positioned downstream of the second gain stage thereby providing additional control of the conversion of the detected signal to the converted signal which is transmitted to the signal processing means.

Figure 7:
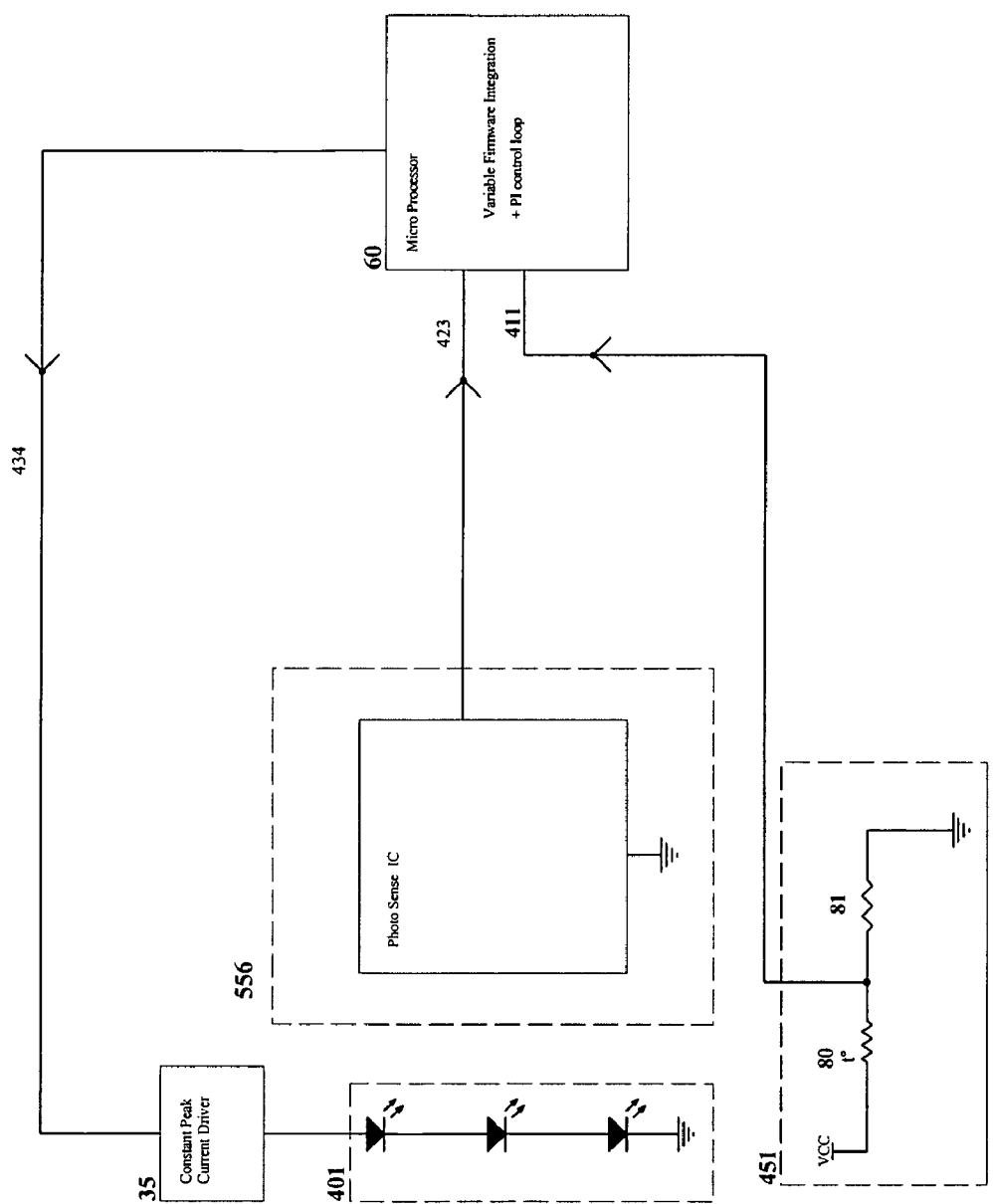
FIG. 7 illustrates another embodiment of a detection component according to the present invention wherein detection, variable amplification, variable integration time and a communication method are incorporated into a single device.

In a further embodiment as illustrated in FIG. 7, the one or more light sensors, the fixed gain circuitry and optionally including the variable gain circuitry, the integrating circuitry with a variable integration time constant, the ADC and a means of communicating with the control system 60, can be integrated onto a single integrated circuit 556. In this embodiment, the control system can communicate a desired gain level to be achieved using the variable gain circuitry and a desired integration time constant for the integrating circuit 556, thereby enabling the integrated circuit to achieve a desired relative resolution of the converted signal.

Feedback Loop Characteristics

In one embodiment, a control system for use with the present invention can stabilize the luminous flux and chromaticity of the light output by the luminaire within substantially four feedback sampling periods, irrespective of a desired or accidental amount of momentary change in luminous flux or chromaticity. These changes can occur due to, for example, system state changes during which the luminaire is switched ON or OFF, fluctuating power supply conditions, light-emitting element failure, or dimming. In consequence of the flicker sensitivity characteristics of the human observer, which is approximately about 60 Hz, the feedback sampling frequency should be at least of the order of about a few hundred Hz, as 60 Hz*4 periods=240 Hz, which can be required to enable four feedback loop sessions to occur without perceptible flicker.

The feedback sampling frequency can be set independently from the PWM frequency. The PWM frequency when chosen sufficiently high, can reduce thermally induced mechanical stress in light-emitting elements due to thermal cycling. Typically, thermal processes in light-emitting elements have a thermal time constant of the order of several milliseconds. Consequently, drive frequencies, for example, PWM frequencies, of more than about 1 kHz can be sufficient to maintain a substantially constant device temperature. In addition, the drive frequency of the electronic drive signals can be set beyond the audible frequency range of the human ear. Depending on the age group, almost all humans cannot audibly perceive sound of frequencies beyond about 16 kHz to about 20 kHz. If desired, the drive frequencies can also be set at higher frequencies, for example, beyond the audible range of certain animal species. However, a drawback to higher drive frequencies is the fact that they can cause higher electrical losses due to parasitic effects in the electronic devices and the electronic circuitry.

In one embodiment, in order to efficiently filter luminous flux output variations due to the pulse width modulation, a low pass filter is designed such that the cut off frequency is less than the PWM frequency. Consequently, the feedback sampling frequency can be set to greater than the minimum feedback sampling frequency and less than the cut off frequency of the low pass filter. It is understood that the control system can be designed to change the feedback sampling frequency to adapt to prevalent brightness conditions. For example, the control system can reduce the feedback sampling frequency when the luminous flux output by the luminaire is reduced which can provide more stable feedback loop dynamics at lower luminous flux outputs of the luminaire.

In one embodiment, the control system can operate at variable feedback sampling frequencies. The control system can adapt the sampling frequency in accordance with desired user interface readings or in accordance with the state of the luminaire under operating conditions. For example, the control system can increase the feedback sampling frequency during transitions between system states, for example upon the dimming of the luminaire. The increased feedback sampling frequency during a transient period can provide a dynamically more stable control loop.

In one embodiment, the control system can be operated, for example, with a feedback sampling frequency of about 300 Hz and a PWM drive frequency at about 30 kHz. This configuration can provide feedback at a rate to enable desired light adjustments to be undetectable to the human eye and a drive frequency beyond of the audible range to humans. The control system can have 11-bit PWM resolution and can achieve 14-bit resolution by either an additional three bit current amplitude control or a suitable time averaged periodic PWM modulation. The low pass filter system for the feedback loop can be designed and dimensioned to filter out the PWM drive frequency about 30 kHz square wave modulation of the light sensor signal.

In one embodiment, processing units such as commercially available signal processors which can run at about 60 MHz clock frequency, can provide the required computational power for the control system. Alternatively, the drive current peak intensity can be controlled with an additional three bit resolution to provide a 14-bit dynamic range brightness control resolution.

Drive Signal Modulation and Drive Signal Resolution

In one embodiment the control system can comprise any combination of proportional, integral, and differential controller elements, for example, digital or analog PI, PD, or PID feedback signal processing. It is further understood, that the control system can implement any form of non-linear or fuzzy control algorithms. It is understood, that the particular control system design and the dimensioning of the respective process or algorithm parameters can be chosen to achieve a desired level of dynamic control of the luminaire. In one embodiment, the control system can comprise an adequately dimensioned digital or analog proportional integral feedback element that can control any desired transition in chromaticity or luminous flux output without oscillation.

Economically priced PWM microcontrollers can generate drive signals at frequencies around about 30 kHz or less with 8-bit to 10-bit resolution. The dynamic range of the control system according to one embodiment of the present invention requires higher resolution which can be achieved by, for example, digitally controlling the amplitude of the PWM drive current at a predetermined required bit resolution. Consequently, the effective brightness resolution of the dimming control signal can be enhanced by mapping the drive current resolution onto the PWM duty factor resolution. In addition, a time averaged effective brightness resolution of the luminaire can be achieved by periodically modulating the PWM duty factors in each of a sequence of PWM periods.

Extended PWM/PCM Control

In one embodiment, the control system employs a method and apparatus that can modulate $2^N$ discrete pulse widths over a period of $2^M$ pulse cycles in which each pulse cycle can have its own pulse width or respective duty cycle. The resulting time averaged or effective pulse width can therefore be controlled with a resolution of $2^{N+M}$ states, thereby providing a greater level of control of the light-emitting elements.

For example, an N-bit pulse width controller requires an N-bit control word which provides a measure for a desired pulse width or a respective duty cycle. The pulse width is typically linearly encoded in the control word such that when the number encoded in the control word is incremented by one the pulse width is extended by a substantially constant amount of time irrespective of the absolute value of the control word. The instant pulse width per pulse cycle of an N-bit pulse width controller can therefore be controlled with N-bit resolution. A control signal provided by an (N+M)-bit control word for example, can be used to control how pulse widths in a sequence of pulse cycles can be modulated. The modulation can be achieved in a number of different ways, for example an N-bit binary word n and an M-bit binary word m can be used to create m pulse cycles of pulse width n+1 and $(2^M-m)$ pulse cycles of pulse width n. In this example however, processing $n=2^N-1$ may require an exception from this procedure, as incrementing $n=2^N-1$ by one can no longer be represented as an N-bit binary number with standard binary encoding schemes. For example, the exception for $n=2^N-1$ can be to create a stream of $2^M$ binary N bit words of constant n. This may be required as, otherwise, modulating the pulse widths during a sequence of pulse cycles without an exception for $n=2^N-1$ can create m pulse cycles of minimum duty factor followed by $(2^M-m)$ pulse cycles each having maximum duty factor, with the effect that the effective time averaged pulse width could vary greatly between its maximum and minimum values depending on the number m.

Furthermore, the average pulse width per period of $2^M$ pulse cycles as described above amounts to an effective time averaged pulse width that corresponds to $n+m/2^M$. This method can therefore be used to control an effective pulse width with a resolution of (N+M)-bits.

In an alternate embodiment, controlling the effective pulse width can include, for example, first providing n for $(2^M-m)$ pulses and subsequently n+1 for m pulses or optionally modulating the pulse widths per pulse cycle in decrements of one. In these scenarios however, n=0 may require an exception from the normal procedure. Furthermore, controlling the effective pulse width may include varying the pulse widths per pulse cycle by more than one or controlling the effective pulse width may include randomly varying the pulse widths in the stream of pulse cycles.

The present invention permits choosing the pulse cycle frequency as an independent parameter while modulating the pulse widths as described. The pulse cycle frequency can be chosen such that attached light-emitting elements, for example LEDs, can be effectively operated under negligible thermal stress conditions. Furthermore, the modulation frequency can be chosen sufficiently high to help reduce perceivable light flicker.

Figure 8:
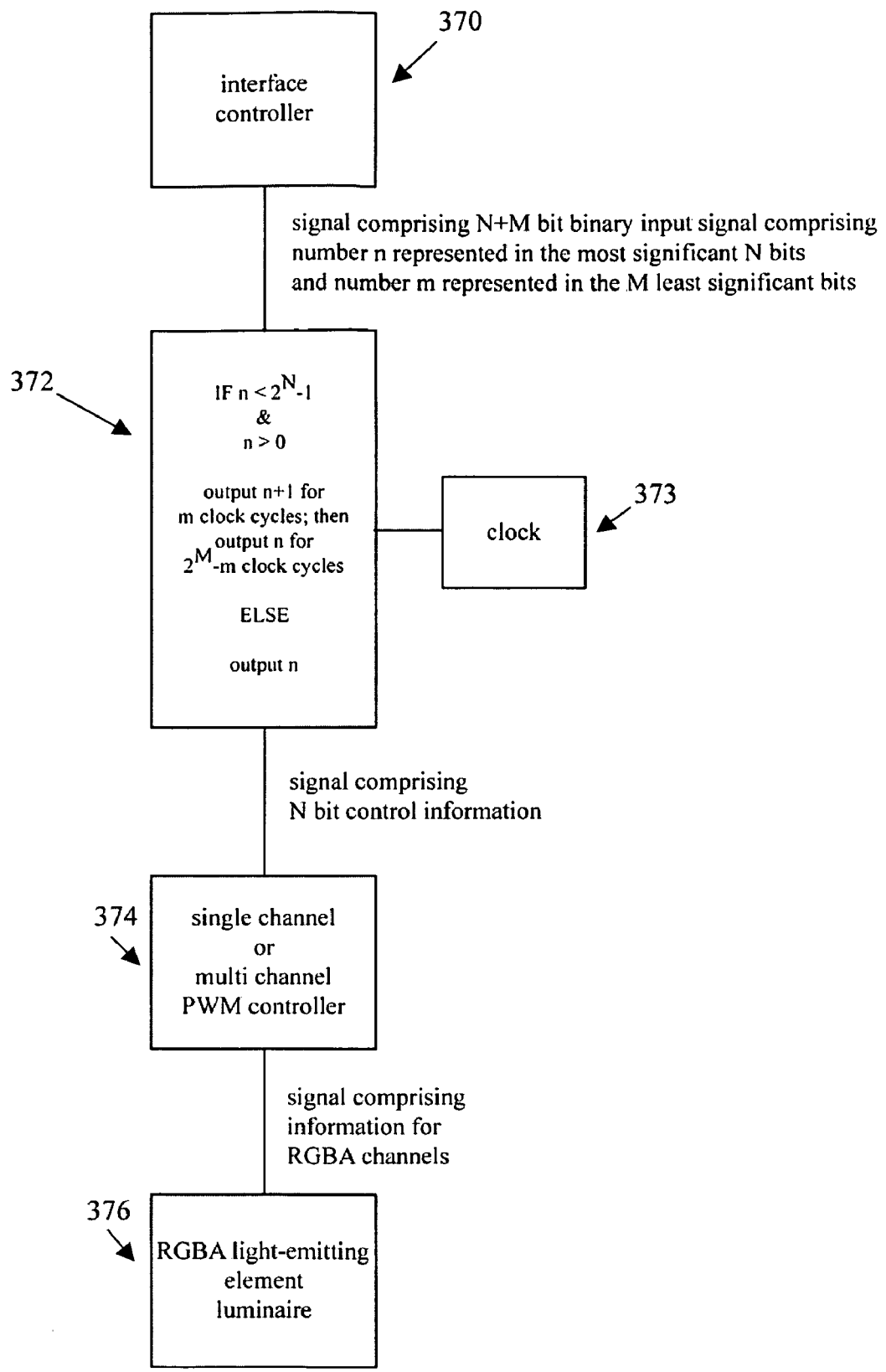
FIG. 8 illustrates a block diagram of the extended pulse width modulation method for a single or multi-channel lighting apparatus according to one embodiment of the present invention.

FIG. 8 illustrates a block diagram of one embodiment of the present invention for use with a single or multi-channel lighting apparatus. An interface controller 370 provides functionality to forward a signal comprising an (N+M)-bit binary signal comprising a number n, represented by the most significant N bits, and a number m, represented by the least significant M bits of this (N+M)-bit binary signal. The interface controller 370 controls the extended pulse width modulator 372, wherein the extended pulse width modulator generates a signal comprising an N-bit pulse width modulation signal and forwards it to an N-bit single or multi-channel pulse width modulation controller 30. A clock 373 provides the extended pulse width modulator 372 with a synchronisation signal having a predetermined frequency, wherein the clock 373 can be a separate or an integral part of the extended pulse width modulator 372. In this manner the pulse width modulator can process or generate dependent or multiple independent signals for a single or multi-channel pulse width modulation controller 374 which can control multiple channels of light-emitting elements such as LEDs with an effective resolution of N+M bits.

The single or multi-channel pulse width modulation controller 374 can be attached to a single or multi-colour light-emitting element luminaire 376, wherein a multi-colour luminaire can comprise light-emitting elements that emit one or more light ranges selected from red, green, blue, amber and white, for example. Light-emitting elements associated with a luminaire can be categorized according to their intended colour impression into multiple colour channels, wherein each colour channel can have its own single-channel pulse width modulation controller or can be operatively connected to one predetermined channel of a multi-channel pulse width modulation controller. The single- or multi-channel pulse width modulation controller can be connected to a single or multi-colour channel luminaire that can have a combination of red, green, blue, amber or any other coloured or otherwise categorized light-emitting elements, for example.

Figure 9:
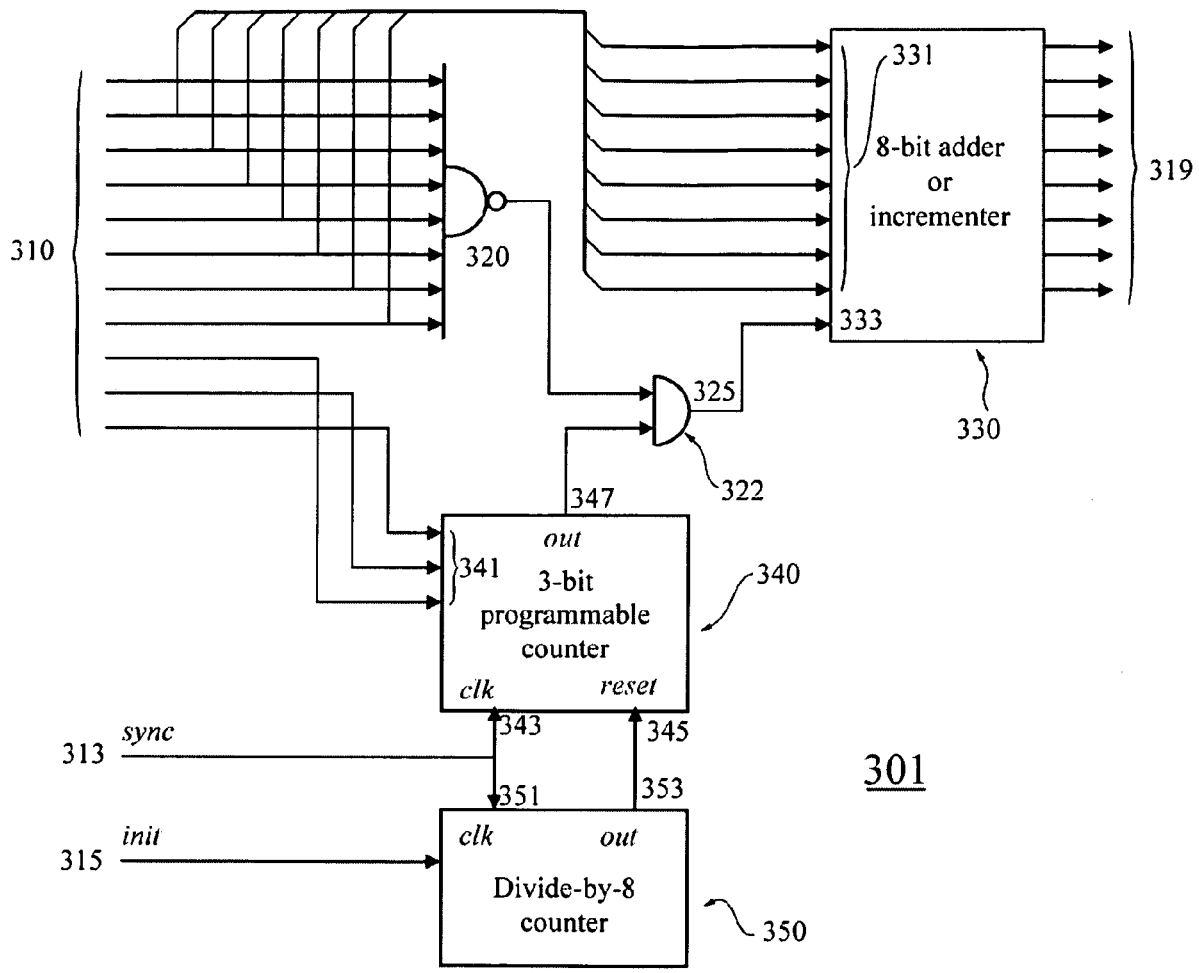
FIG. 9 illustrates a schematic circuit diagram of an embodiment of a control component.

FIG. 9 illustrates a schematic of one embodiment an electronic circuit 301 utilizing the extended pulse width modulation method. The circuit has an eleven-line input bus 310 for receiving an eleven-bit parallel input control signal, a sync signal input line 313, an init signal input line 315, and an eight-bit output bus 319 for providing the parallel output control signal to a compatible eight-bit PWM controller, which is not shown. The circuit includes an exception handling sub-circuit comprising an eight-input NAND gate 320 and a two-input AND gate 325. Eight lines of the eleven-line input bus for carrying the eight most significant bits of the input control signal are accordingly connected to the first port 331 of an eight-bit adder 330. The input line 333 of the second port of the eight-bit adder carrying the least significant bit is connected to the output 325 of the two-input AND gate 322 which also constitutes the output of the exception handling sub-circuit. The remaining seven lines of the second port are not shown and are set to arithmetic zero. Depending on the adder device this can be done by either connecting these lines to arithmetic high or arithmetic low voltage. Three lines of the eleven-line input bus for carrying the three least significant bits of the input control signal are connected to the three control signal input lines 341 of a three-bit programmable counter 340. The three-bit programmable counter further has a clock signal input 343 and a reset signal input 345 connected to the respective lines of the circuit as illustrated in FIG. 9 for receiving the respective signals under operating conditions. A divide-by-eight counter 350 increments its counter upon receiving a predetermined change in the sync signal at its clk input 351. The counter resets to zero upon receiving an init or upon incrementing the counter beyond seven. The out signal output 353 of the divide-by-eight counter is connected to the reset signal input 345 of the three-bit programmable counter. When the divide-by-eight counter 350 resets to zero, an out signal output on its out signal line resets the three-bit programmable counter 340 via its reset signal input. The three-bit programmable counter 340 increments its counter upon detection of a predetermined state change in the sync signal and compares the counter value with the number encoded in the three-bit input control signal. When the counter value exceeds the encoded number, its output 347 changes from logical one to logical zero and the output of the attached two-input AND gate 322 will be zero.

For the embodiment illustrated in FIG. 9, under operational conditions the exception handling sub-circuit prevents the extended pulse width modulation circuit from incrementing an already maximal binary number encoded in the eight most significant bits of the input control signal. This is achieved by setting the least significant bit of the second port of the adder input signal to zero, i.e. by AND combining the output of the eight-input NAND gate and the output of the three-bit programmable counter when the eight most significant bits represent the number $2^8-1$ (generally $2^N-1$).

It would be readily understood by a worker skilled in the art that the total number of bits, the number of most significant bits and the number of least significant bits of the input control signal can be different from the ones specified above. For example, the above circuit can be adapted for attaching a ten-bit PWM controller using an input control signal having ten most significant bits and a predetermined number of least significant bits necessary to achieve a desired effective PWM resolution.

Furthermore, as would be obvious to a person skilled in the art, the circuit for extended pulse width modulation can also include input or output signal buffer elements such as latches, registers, and multiplexers. The circuit can be modified for example for receiving input signals or providing output signals on systems other than parallel bus systems.

In one embodiment, an incrementer can be used in place of the eight-bit adder of the above described circuit. The incrementer can have one control signal input port, for example a single eight bit input port, and increments the number represented by a signal applied to the control signal input port by one, upon detection of a predetermined state change in a trigger signal applied to a trigger signal port which would occur under operating conditions.

Figure 10:
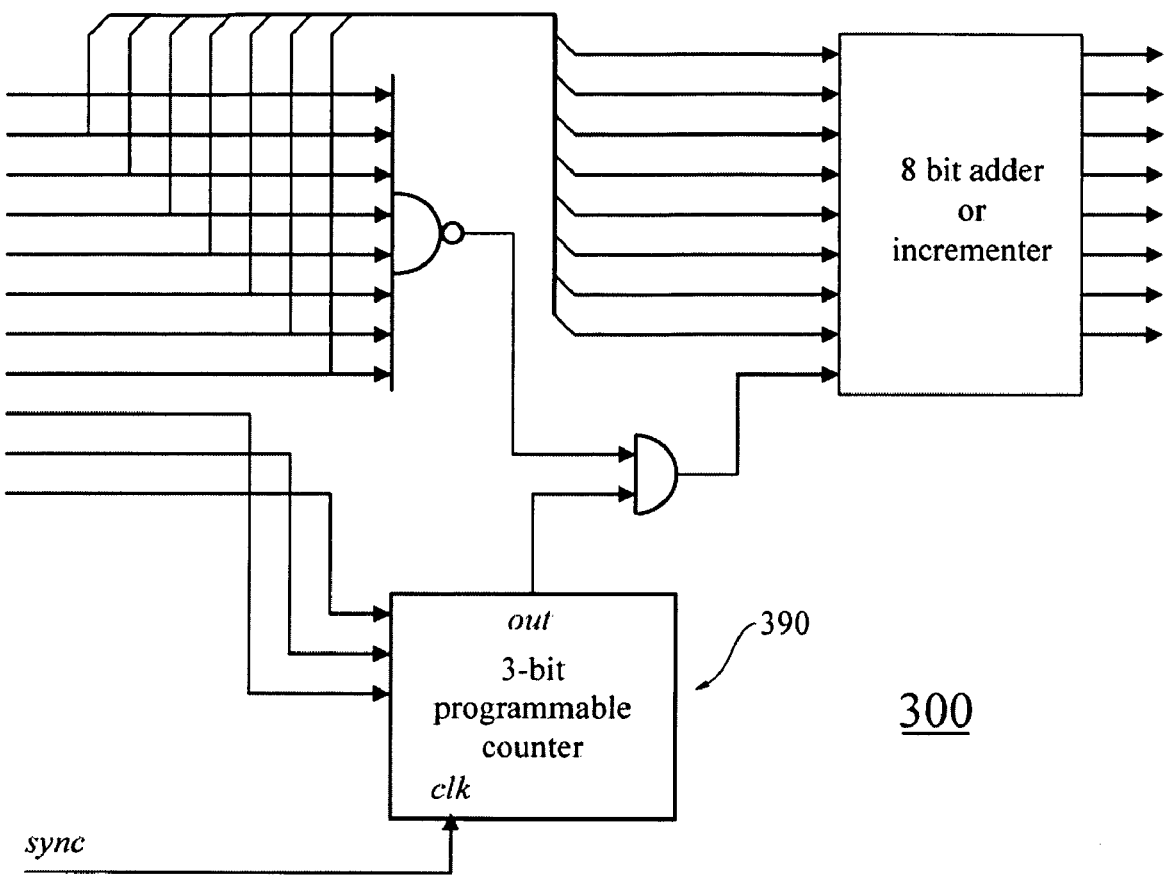
FIG. 10 illustrates a schematic circuit diagram of another embodiment of a control component.

FIG. 10 illustrates a schematic of another embodiment of an electronic circuit 300 for the extended pulse width modulation method, wherein the divide-by-eight counter as seen in FIG. 9, has been removed. This embodiment uses fewer components and can be used if a sudden state change in the input control signal always happens synchronously when the three-bit counter resets to zero, for example or if a state change in the input control signal happens asynchronously and the action of instantaneously resetting the three-bit programmable counter 390 is not required. Taking into account the preferred pulse cycle duration or frequencies for general lighting purposes the asynchronous state change generally does not need any exception handling, since state changes in the input control signal typically occur on a timescale of multiples rather than fractions of eight (generally $2^M$) pulse cycles. The circuit 300 may produce, due to state changes in the input control signal other than at the beginning of an eight (generally $2^M$) pulse cycle period, averaged pulse width duty factors which deviate from the specified duty factor encoded in the eleven (generally N+M) bit input control signal by no more than an equivalent of a single least significant bit change in the input control signal.

Figure 11:
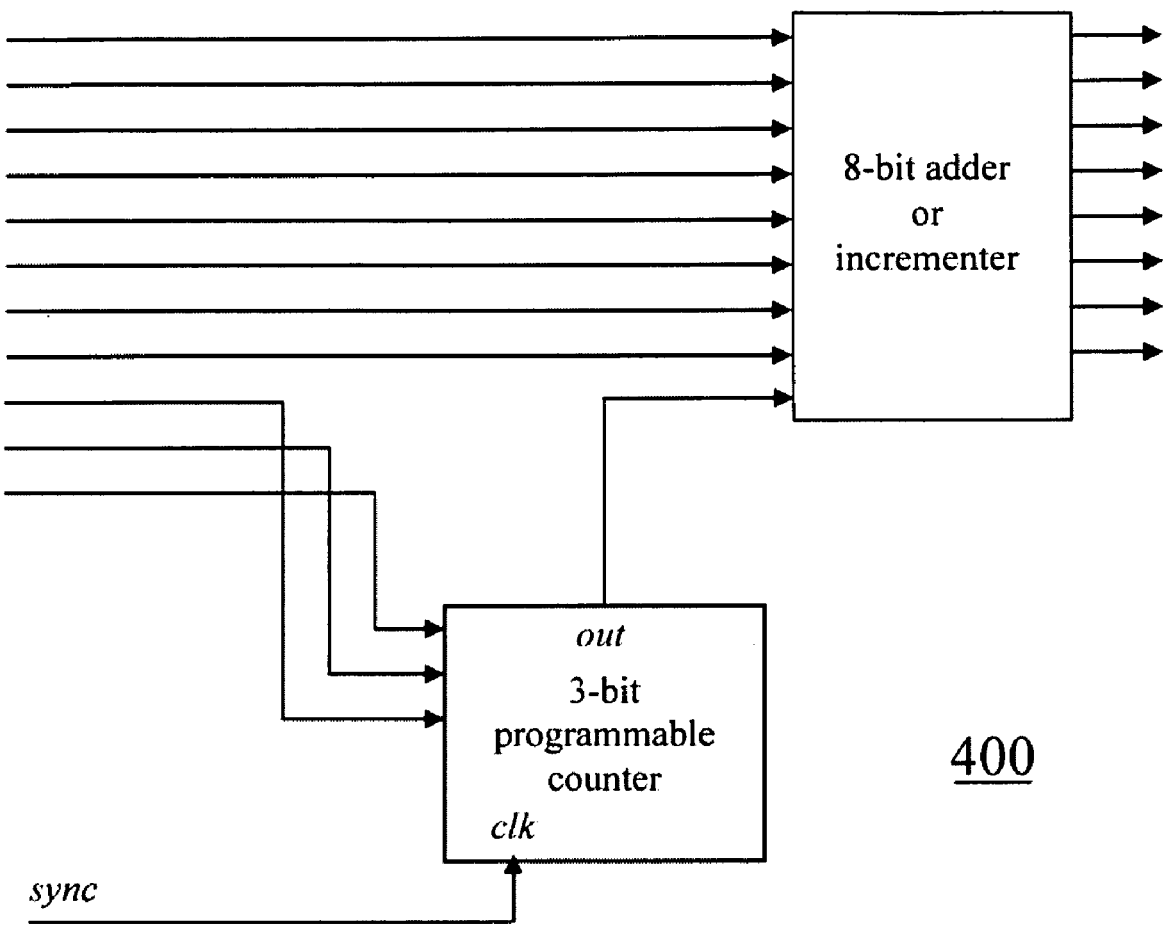
FIG. 11 illustrates a schematic circuit diagram of another embodiment of a control component.

FIG. 11 illustrates a schematic of another embodiment of an electronic circuit 400 for the extended pulse width modulation method which completely eliminates the exception handling sub-circuit as described above. In this embodiment, when all eight (generally N) most significant bits are set to logical high, the eight bit adder or incrementer "overflows" i.e. resets its output signals to zero. Depending on the number m encoded in the three (generally M) least significant bits of the input control signal, this circuit sets all output signals to logical zero for a period of m predetermined changes in the sync signal (pulse cycles) and sets the output signals to logical one for a subsequent eight minus m (generally $2^M$-m) pulse cycles provided that the input control signals do not change during the total period of eight (generally $2^M$) pulse cycles. The circuit illustrated in FIG. 11 can be used for example, when it is not required to suppress such an overflow condition, or when the eight (generally N) most significant bits of the input control signal never concurrently assume their logical high (arithmetical one) values.

Figure 12:
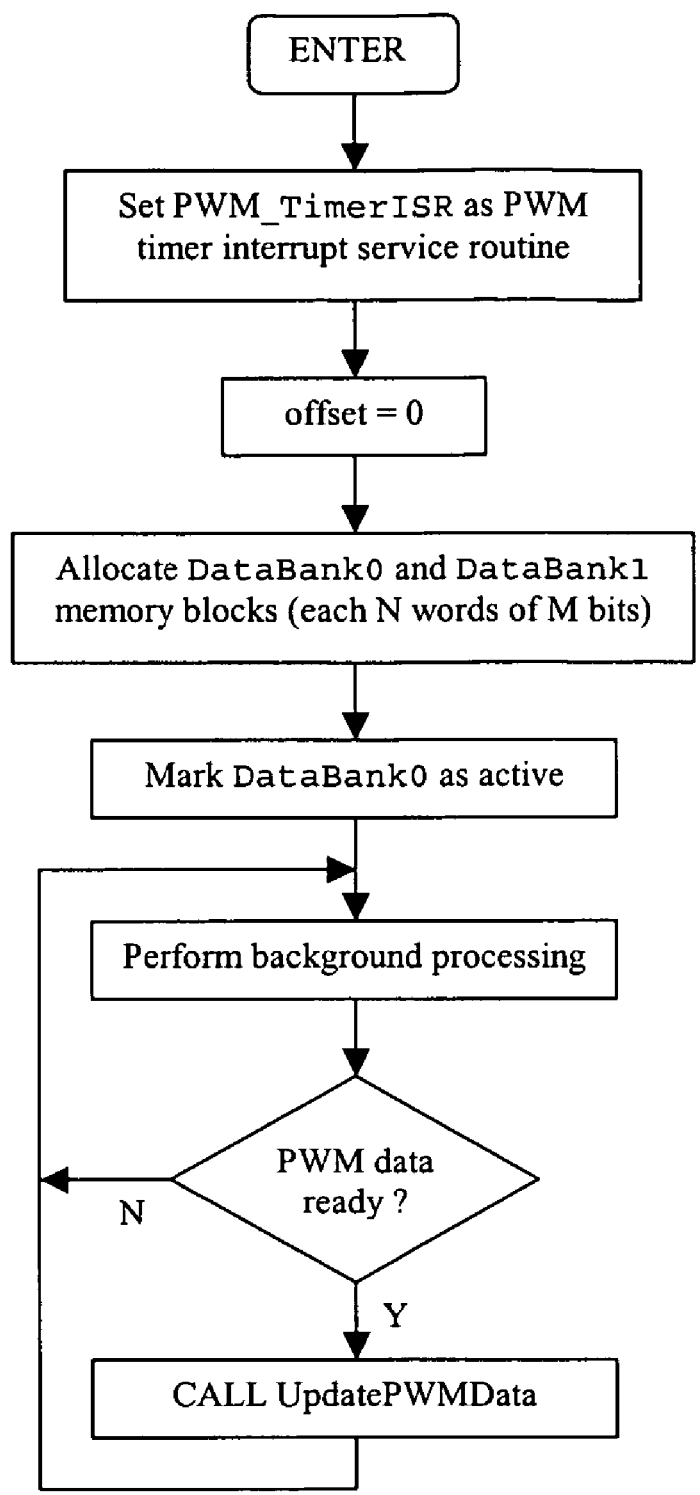
FIG. 12 illustrates a flow diagram for a micro controller main program.
Figure 13:
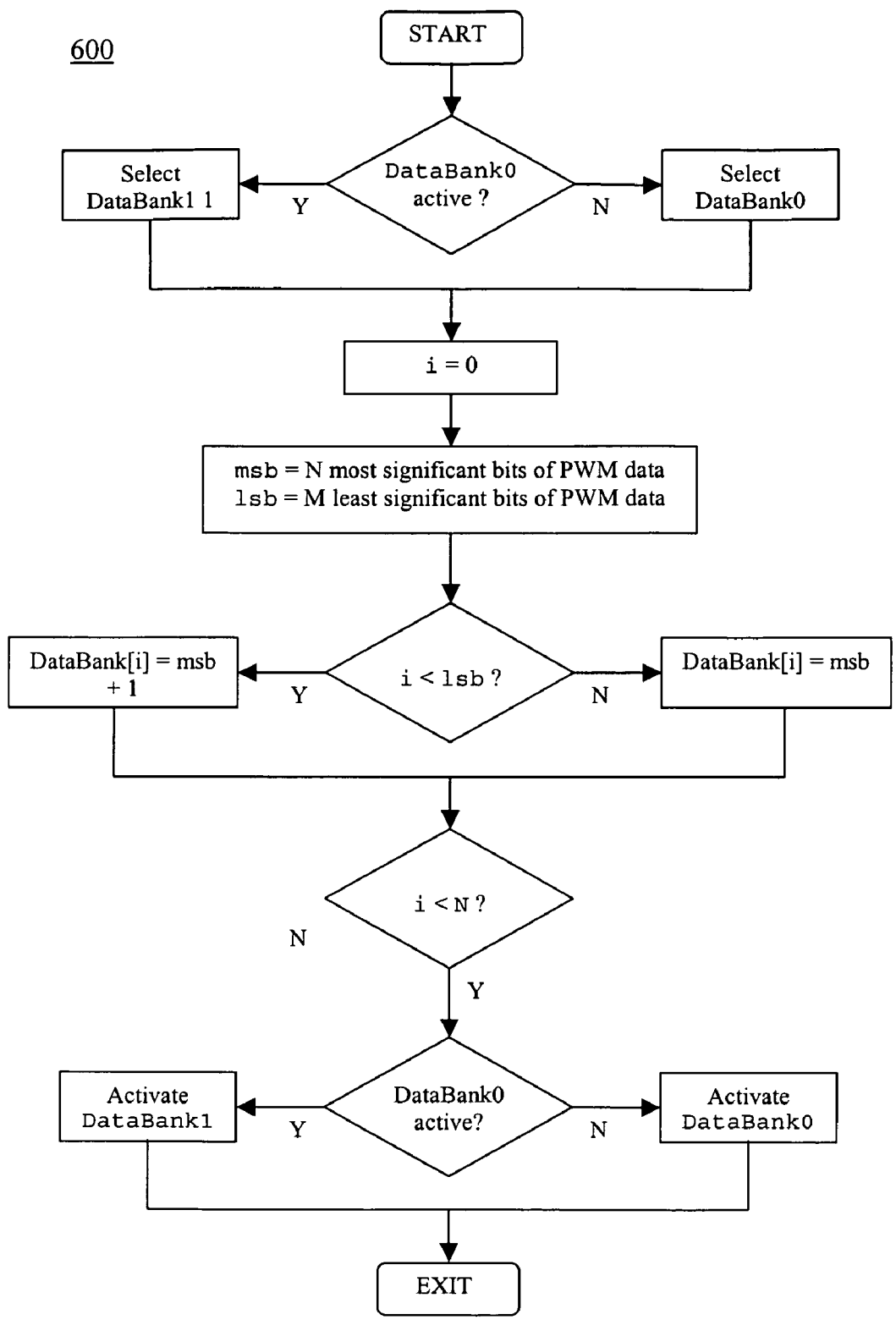
FIG. 13 illustrates a flow diagram for a subroutine for the main program as illustrated in FIG. 12.
Figure 14:
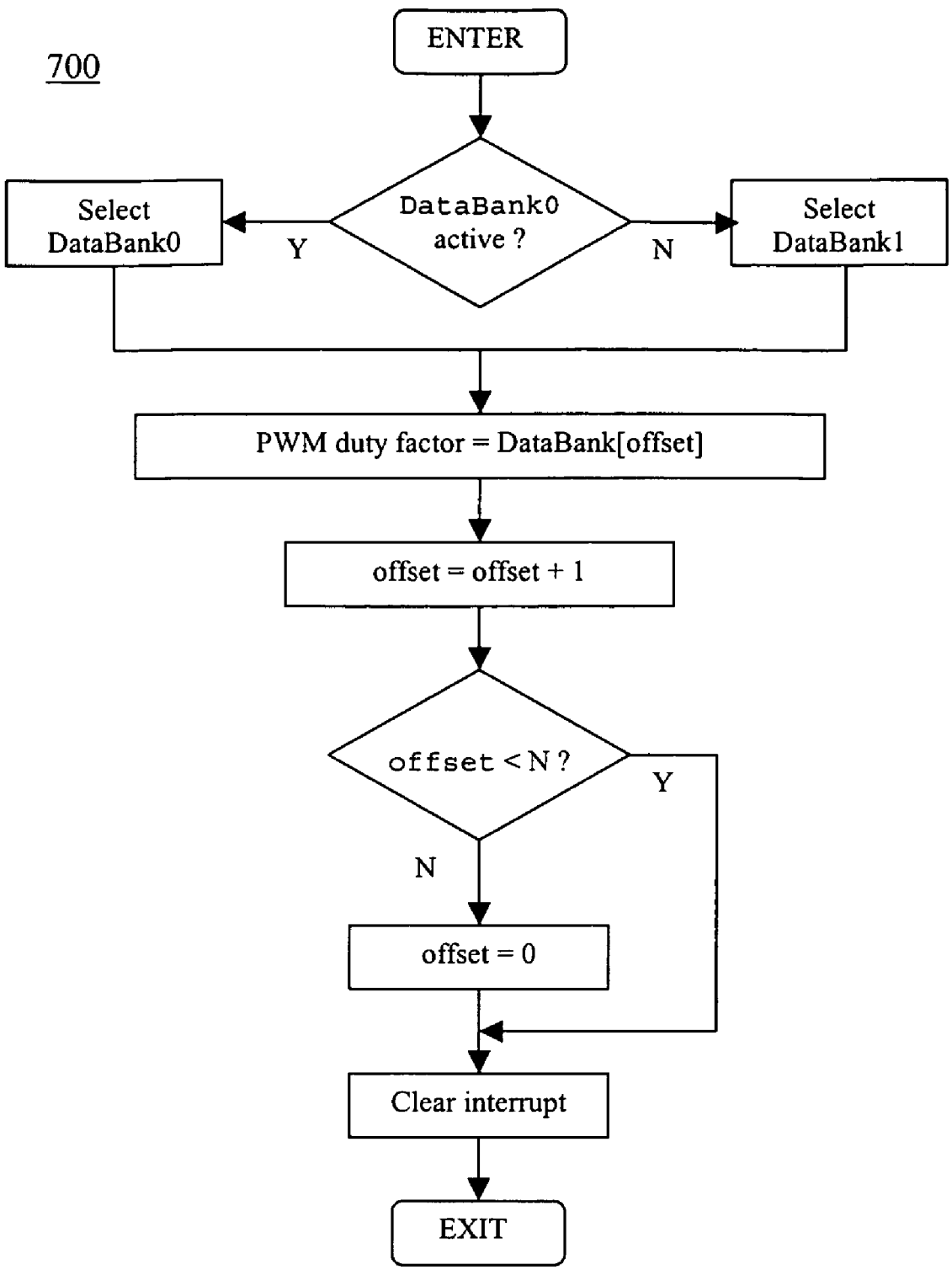
FIG. 14 illustrates a flow diagram for another subroutine for the main program as illustrated in FIG. 12.

In another embodiment, the extended PWM controller can be implemented in firmware as shown in FIGS. 12 to 14 for use with, for example, a Philips LPC2132 microcontroller.

FIG. 12 illustrates a microcontroller main_PWM program 500. This function specifies the function PWM_TimerISR as a PWM period timer interrupt service routine, initializes static variable offset to zero, allocates two blocks of random access memory called DataBank0 and DataBank1, wherein each block comprises N words of M bits, and marks DataBank0 as active. The function then enters a continuous loop wherein it polls an external device, such as a remote interface, for available PWM data. Alternatively, the data may also be generated within main_PWM program 500. When PWM data which comprises an N+M-bit word is available, the main_PWM program calls the UpdatePWMData function.

FIG. 12 illustrates the UpdatePWMData function 600 which first determines which data bank is active, then selects the inactive data bank to write any subsequent data to. It then sets loop counter i to zero and sets msb as the N most significant bits and lsb as the M least significant bits of the N+M signal before performing N loops, wherein within each loop it sets the $i^{th}$ memory location of the selected data bank to msb+1 if i is less than lsb, else it sets the $i^{th}$ memory location to msb. Upon completion, it marks the active data bank as inactive and the inactive data bank as active before returning to the calling function main_PWM.

FIG. 14 illustrates the PWM period timer interrupt service routine PWM_TimerISR 700 which first determines which data bank is active, and then selects the active data bank to read data from. It then reads the offset$^{th}$ element of the active data bank, sets the PWM period timer hardware register to this value, and increments the static variable offset. If offset is then equal to N, it is reset to zero. The timer interrupt flag is then cleared and the interrupt function PWM_TimerISR exits.

In one embodiment, the present invention can be applied to pulse code modulation (PCM) rather than solely for PWM. Having specific regard to FIG. 8, PWM controller 374 can be replaced with a PCM controller. A PCM based embodiment can be implemented with a firmware controlled general-purpose microcontroller, for example, a Philips LPC2132 microcontroller. This implementation is illustrated in FIGS. 15 to 17.

Figure 15:
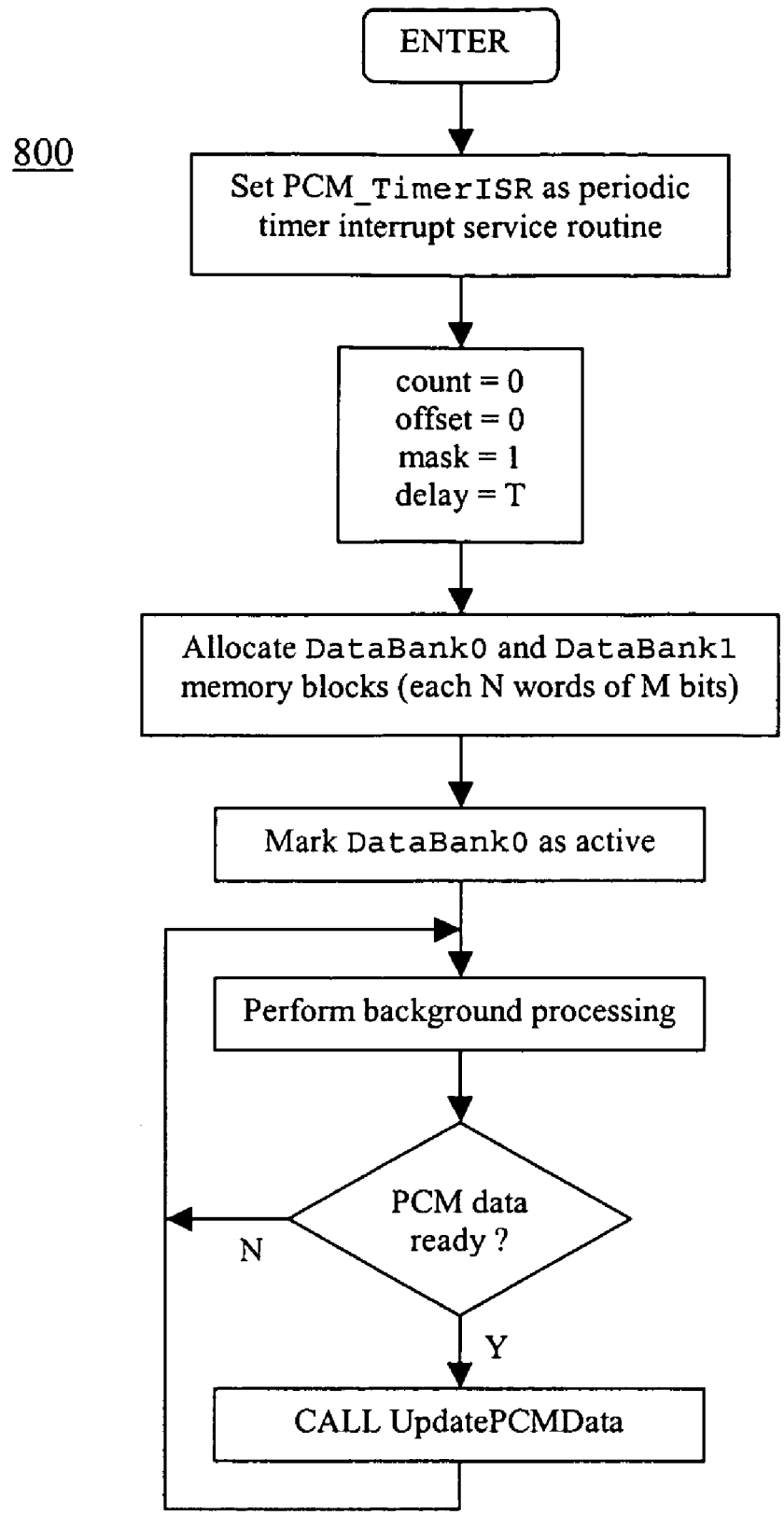
FIG. 15 illustrates a flow diagram for another micro controller main program.

FIG. 15 illustrates a microcontroller main_PCM program 800. This program specifies the function PCM_TimerISR as a periodic timer interrupt service routine, initializes static variables Count and Offset to zero, Mask to 1, and timer Delay to T (where T is typically one microsecond), allocates two blocks of random access memory called DataBank0 and DataBank1, wherein each block comprises N words of M bits, and marks DataBank0 as active. The function then enters a continuous loop wherein it polls an external device, such as a remote interface, for available PCM data. Alternatively, the data may also be generated within the main_1 function (not illustrated). When PCM data comprising an N+M-bit word is available, the main_1 function calls the UpdatePCMData function.

Figure 16:
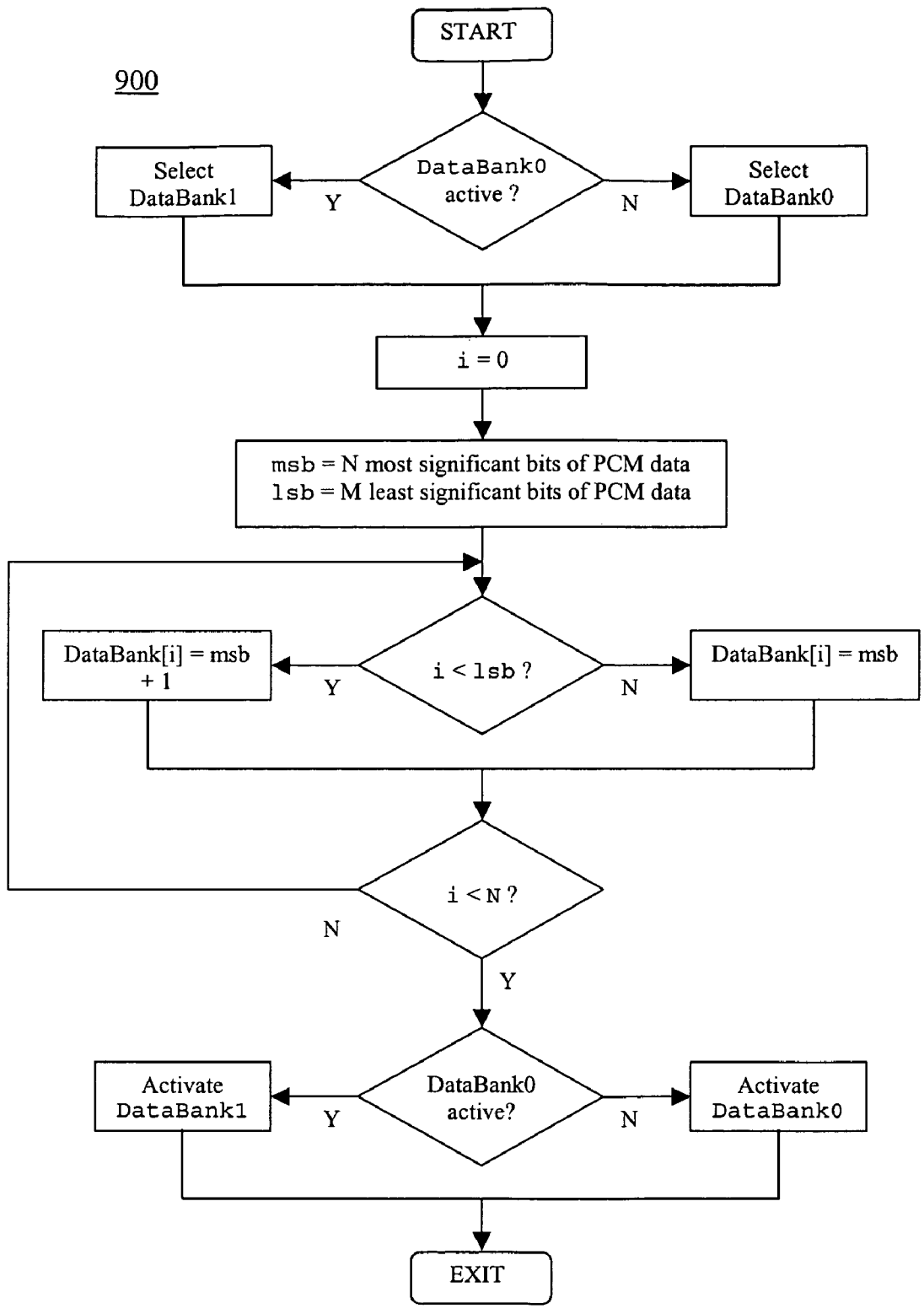
FIG. 16 illustrates a flow diagram for a subroutine for the main program as illustrated in FIG. 15.

FIG. 16 illustrates the UpdatePCMData routing 900 which first determines which data bank is active, then selects the inactive data bank to write any subsequent data to. It then sets loop counter i to zero and sets msb as the N most significant bits and lsb as the M least significant bits of the N+M signal before performing N loops, wherein within each loop it sets the $i^{th}$ memory location of the selected data bank to msb+1 if i is less than lsb, else it sets the $i^{th}$ memory location to msb. Upon completion, it marks the active data bank as inactive and the inactive data bank as active before returning to the calling function main_1.

Figure 17:
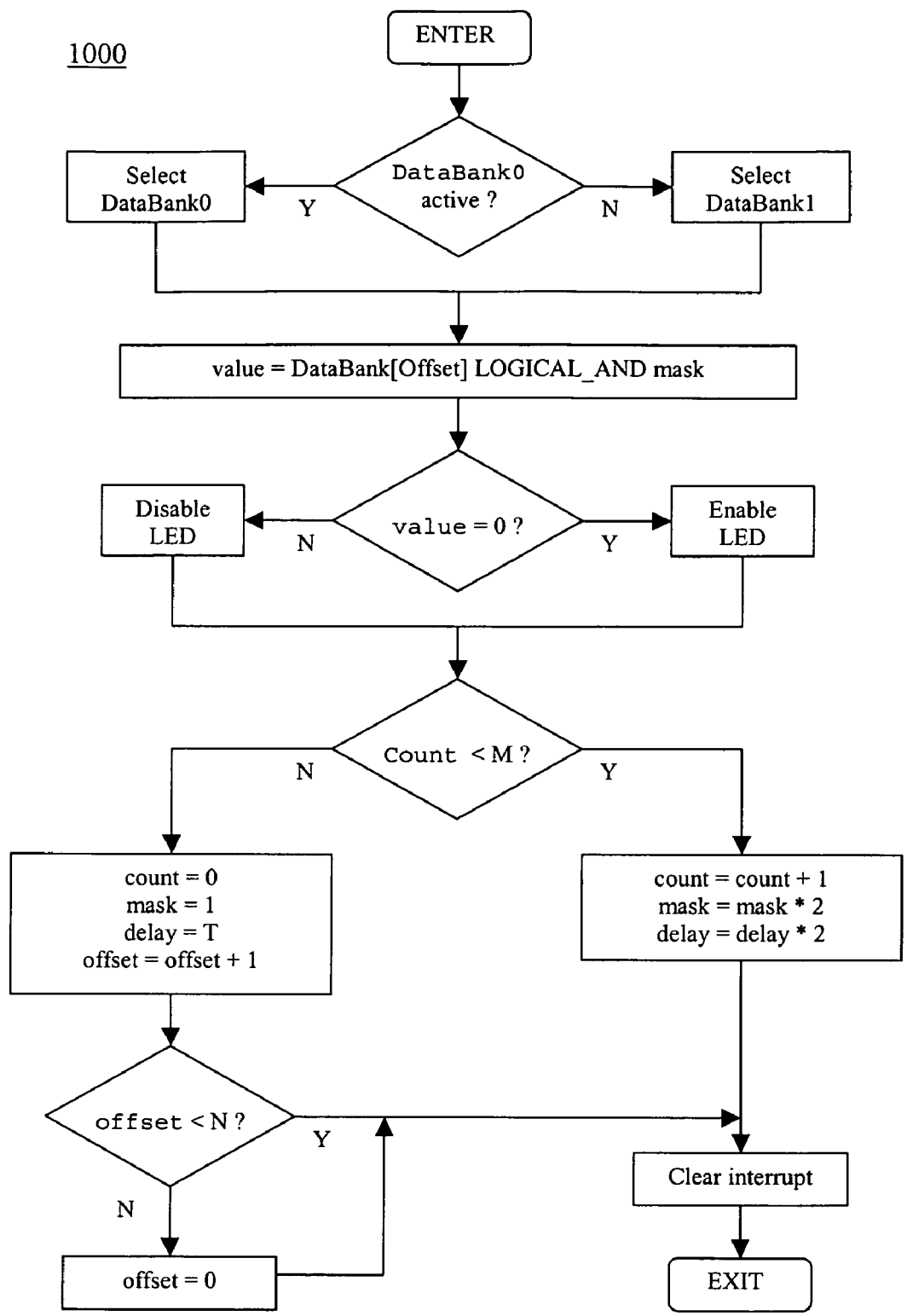
FIG. 17 illustrates a flow diagram for another subroutine for the main program as illustrated in FIG. 15.

FIG. 17 illustrates the periodic timer interrupt service routine PCM_TimerISR 1000 which first determines which data bank is active, and then selects the active data bank to read data from. It then reads the offset$^{th}$ element of the active data bank and performs a logical AND with the static mask variable to determine the count$^{th}$ bit of the element. If the bit is zero, the LED channel is disabled; otherwise, it is enabled. If count is less than M, then the static variable count is incremented, the static variable mask is multiplied by two to effect a logical left shift of the binary bit, and the static variable delay, which represents the timer delay, is multiplied by two. Otherwise, count is reset to zero, mask is reset to one, delay is reset to T, and the static variable offset is incremented. When offset is then equal to N, it is reset to zero. Finally, the timer interrupt flag is cleared and the interrupt function PCM_TimerISR exits.

In one embodiment of the present invention pulse widths can be defined in control coordinates (n,m,N,M). It would be obvious that all such pulse widths can be transformed into a time domain by merely applying a simple coordinate transformation. For example, a pulse width pw whose duration is specified by a specific PWM control number n can have a time duration of, for example, $pw=(2^N-1)^{-1}*n*PW$ in which PW is the period of the pulse cycle. Alternatively, the transformation can also be defined by $2^{-N}*(n*PW)$; the specific choice is a mere matter of choosing the zero origin for n.

In one embodiment of the present invention, the control method can be implemented in an apparatus or system having one or more output channels to jointly or separately control each channel either simultaneously or in a time-multiplexed fashion. Each channel can be used to drive a certain colour of light-emitting diodes, for example.

It is understood, that the user interface and system parameters can be calibrated in any desired observer standard, for example, the CIE 1931 system.

The invention will now be described with reference to specific examples. It will be understood that the following examples are intended to describe embodiments of the invention and are not intended to limit the invention in any way.

EXAMPLES

Example 1

Solid-State Lighting Luminaire

According to one embodiment of the present invention a solid-state lighting luminaire can be configured as illustrated in FIG. 1, wherein extended pulse width modulation as defined above is implemented in the control system 60 using the extended pulse code modulation method as illustrated FIGS. 15 to 17. This extended pulse code modulation method can be implemented in firmware on a commercial microcontroller which can form part of the control system 60. The light sensors 50 are broadband sensors and are associated with specific filters enabling the sensors to detect light in one predetermined wavelength region, for example red, green and blue regions. This format of light sensors are integrated with associated amplification stages as illustrated in FIG. 6. Additional functions may also be implemented, such as for example monitoring of voltage sensors 70 and temperature sensors 45 by the control system. This information is used by the control system for feedback and feedforward control which is implemented in firmware associated with the control system 60.

Example 2

Solid-State Lighting Luminaire

According to one embodiment of the present invention a solid-state lighting luminaire can be configured as illustrated in FIG. 1, wherein extended pulse width modulation as defined above is implemented in the control system 60 using the extended pulse width modulation method as illustrated FIGS. 12 to 14. This extended pulse width modulation method can be implemented in firmware on a commercial microcontroller which can form part of the control system 60. The light sensors 50 are broadband sensors and are associated with specific filters enabling the sensors to detect light in one predetermined wavelength region, for example red, green and blue regions. This format of light sensors are integrated with associated amplification stages as illustrated in FIG. 6. Additional functions may also be implemented, such as for example monitoring of voltage sensors 70 and temperature sensors 45 by the control system. This information is used by the control system for feedback and feedforward control which is implemented in firmware associated with the control system 60.

Example 3

Solid-State Lighting Luminaire

According to one embodiment of the present invention a solid-state lighting luminaire can be configured as illustrated in FIG. 1, wherein extended pulse width modulation as defined above is implemented in the control system 60 using the extended pulse code modulation method as illustrated FIGS. 15 to 17. This extended pulse code modulation method can be implemented in firmware on a commercial microcontroller which can form part of the control system 60. The light sensors 50 are narrow band sensors which detect light in one predetermined wavelength region, for example red, green and blue regions. These light sensors are integrated with associated amplification stages as illustrated in FIG. 2. Additional functions may also be implemented, such as for example monitoring of voltage sensors 70 and temperature sensors 45 by the control system. This information is used by the control system for feedback and feedforward control which is implemented in firmware associated with the control system 60.

Example 4

Solid-State Lighting Luminaire

According to one embodiment of the present invention a solid-state lighting luminaire can be configured as illustrated in FIG. 1, wherein extended pulse width modulation as defined above is implemented in the control system 60 using the extended pulse code modulation method as illustrated FIGS. 15 to 17. This extended pulse code modulation method can be implemented in firmware on a commercial microcontroller which can form part of the control system 60. The light sensors 50 are broadband sensors and are associated with specific filters enabling the sensors to detect light in one predetermined wavelength region, for example red, green and blue regions. This format of light sensors are integrated with associated amplification stages as illustrated in FIG. 3. This sensor information is used by the control system for feedback control implemented in firmware associated with the control system 60, for control of the solid-state lighting luminaire.

Example 5

Applications of Use of the Feedback and Control System

Incandescent Lamp Simulation

It is known, that when an incandescent bulb is dimmed, its correlated colour temperature (CCT) changes, wherein when the voltage is reduced, the colour temperature becomes lower, the colour appearance becomes "warmer," and the lumen output decreases. The feedback and control system according to the present invention can simulate this behaviour in accordance with the preceding formula. Such a feature may be desirable for example to set certain moods in restaurants or residences.

Energy-Efficient Dimming

It is known that currently red and amber LEDs are more efficient than green or blue LEDs. For example, Lumileds' 1-watt Luxeon blue and green LEDs have luminous efficacies of 10 and 30 lumens per watt respectively, while red and amber LEDs have luminous efficacies of 44 and 36 lumens per watt respectively. For a room illuminated using a luminaire comprising the feedback and control system according to the present invention and if a room is equipped with an occupancy sensor, the luminaire can set the illumination colour to be predominantly red and amber when the room is not occupied, thereby taking advantage of the fact that this colour of white light will be more energy-efficient for a given luminous intensity.

Daylight Tracking

It is known that from sunrise to sunset, the colour of light due to direct sunlight and diffuse skylight changes throughout the day. A luminaire with the feedback and control system according to the present invention can be designed such that the CCT and intensity of daylight entering a room can be measured and simulated by the room luminaire in order to provide a constant colour balance throughout the room. In addition, the luminaire may simulate summertime daylight colours during overcast winter days for people suffering from Seasonal Adjustment Disorder (SAD). Furthermore, the luminaire may simulate changing daylight intensity and colour for interior spaces without windows, or for night-shift workers.

Flame Simulation

In one embodiment, a luminaire comprising the feedback and control system according to the present invention may be configured to provide "mood lighting" that accurately simulates wax candle flames or flames in a fireplace, for example.

Dynamic Aquarium Lighting

It is known that salt-water aquaria require predominantly blue light for optimal coral growth and health, and to discourage algae growth. However, people prefer to see their fish under "natural" white light. A luminaire comprising the feedback and control system according to the present invention may be controlled by room occupancy sensors that change the light intensity and colour balance for a aquarium depending on whether people are in the room Horticulture Lighting It is also known that certain types of plants require specific and narrow spectral bands of light for optimum growth. In addition, the optimal spectral power distribution for those plants may vary in accordance with the plants' circadian rhythms. A luminaire comprising the feedback and control system according to the present invention may employ LEDs with different center wavelengths that are optimal for the growth of specific species of plants, and vary their relative intensity according to the plant's circadian rhythm and seasonal growth patterns. This luminaire may also be interconnected with an environmental system that monitors and controls temperature, air flow, nutrient supply, and other environmental factors. In this manner the luminaire may ensure the spectral power distribution and average intensity is maintained Security Lighting It is known that video camera sensors without IR cutoff filters, are optimized for red light sensitivity. Therefore a luminaire comprising the feedback and control system according to the present invention used in association with this form of security system, can operate such that the use red LEDs for energy-efficient surveillance illumination is standard and this illumination can be switched to low level white light when security staff is present or when an emergency occurs for example.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

We claim:

1. A system for feedback and control of a luminaire including two or more light-emitting elements in two or more colors, each of the two or more light-emitting elements supplied with electrical current to produce light of a desired chromaticity and luminous flux under operating conditions, the system comprising:
   a) a feedback system including two or more light sensors for detecting the light and generating color signals, the feedback system generating current values representative of luminous flux and chromaticity of the light from the color signals, the feedback system further including two or more color filters associated with the two or more light sensors for providing the color signals; and
   b) a control system operatively integrated with the feedback system, said control system determining an adjustment factor through a correlation of the current values and a desired chromaticity and luminous flux, the control system adjusting the electrical current to one or more of the two or more light-emitting elements in accordance with the adjustment factor, the control system adjusting the electrical current without perceivable visual flicker or momentary chromaticity shifts.

2. The system according to claim 1, wherein the feedback system further comprises an amplification module operatively coupled to the two or more light sensors, the amplification module comprising a means for applying a gain to the color signals.

3. The system according to claim 2, wherein the means for applying a gain is a logarithmic amplifier.

4. The system according to claim 2, wherein the means for applying a gain applies a selectable gain to the color signals, the selectable gain dependent on the color signals.

5. The system according to claim 4, wherein means for applying a gain is a programmable gain amplifier or an amplifier with a digital potentiometer.

6. The system according to claim 2, wherein the two or more light sensors and the amplification module are formed as a single integrated circuit.

7. The system according to claim 1, wherein the feedback system further comprises one or more thermal sensors for generating signals representative of the two or more light-emitting elements temperature.

8. The system according to claim 1, wherein the feedback system further comprises one or more voltage sensors for generating signals representative of the electrical current transmitted to one or more of the two or more light-emitting elements.

9. The system according to claim 1, wherein the one or more light sensors are operatively coupled to a filter system, the filter system for filtering undesired frequencies from the color signals, the undesired frequencies including the control system operational frequency.

10. The system according to claim 1, wherein one or more of the two or more light sensors are broadband sensors.

11. The system according to claim 1, wherein the one or more of the two or more light sensors are narrowband sensors.

12. The system according to claim 1, wherein the two or more light sensors are optically coupled to a filter, the filter defining a wavelength range of the light that interacts with the two or more light sensors.

13. The system according to claim 1, wherein the control system comprises means to adjust the electrical current to the two or more light-emitting elements using pulse width modulation or pulse code modulation, each of the pulse width modulation and pulse code modulation having a pulse cycle.

14. The system according to claim 13, wherein the control system further comprises a means for modulating pulse width for each pulse cycle, thereby increasing control resolution of the two or more light-emitting elements.

15. The system according to claim 14, wherein the means for modulating the pulse width comprises a N-bit adder operatively coupled to a controller, the N-bit adder providing the controller with control signals for controlling the electrical current to the two or more light-emitting elements, the means for modulating the pulse width further comprising a M-bit programmable counter coupled to the N-bit adder, the means to modulate the pulse width thereby providing a control resolution of $2^{N+M}$ states.

16. The system according to claim 15, wherein the means for modulating the pulse width further comprises an exception handling circuit operatively connected to the M-bit programmable counter and the N-bit adder.

17. The system according to claim 16, wherein the means for modulating the pulse width further comprises a divide by N counter operatively connected to the M-bit programmable counter, said divide by N counter for resetting the M-bit programmable counter.

18. The system according to claim 1, wherein the feedback system is operated at a sampling frequency greater than or equal to about 240 Hz.

19. The system according to claim 1, wherein the control system is operated at a control frequency greater than or equal to about 20 kHz.

20. A method for controlling a luminaire including two or more light-emitting elements in two or more colors, each of the two or more light-emitting elements supplied with electrical current to produce light of desired chromaticity and luminous flux under operating conditions, the method comprising the steps of:
   a) sensing, using two or more light sensors, predetermined fractions of light emitted by the luminaire in each of the two or more colors providing two or more sensed color signals;
   b) processing, using two or more color filters associated with the two or more light sensors each of the one or more sensed color signals thereby determining two or more filtered color signals;
   c) transforming the one or more filtered color signals directly into control signals representative of the desired chromaticity and luminous flux; and
   d) adjusting electrical current supplied to each of the two or more light-emitting elements based on the control signals, wherein the step of adjusting is performed without perceivable visual flicker or momentary chromaticity shifts.

* * * * *